United States Patent
Koseoglu et al.

(10) Patent No.: US 11,998,898 B1
(45) Date of Patent: Jun. 4, 2024

(54) HYDROCRACKING CATALYST FOR HYDROCARBON OIL INCLUDING TITANIA BINDER AND PHOSPHOROUS ACTIVE COMPONENT, METHOD FOR PRODUCING HYDROCRACKING CATALYST, AND METHOD FOR HYDROCRACKING HYDROCARBON OIL

(71) Applicants: Saudi Arabian Oil Company, Dhahran (SA); JGC Catalysts & Chemicals Ltd., Kanagawa (JP); Japan Cooperation Center for Petroleum and Sustainable Energy, Tokyo (JP)

(72) Inventors: Omer Refa Koseoglu, Dhahran (SA); Robert Peter Hodgkins, Dhahran (SA); Yusuke Matsumoto, Kawasaki (JP); Koji Uchida, Kawasaki (JP); Naoya Kojima, Kawasaki (JP)

(73) Assignees: Saudi Arabian Oil Company, Dhahran (SA); JGC Catalysts and Chemicals Ltd., Kawasaki Kanagawa (JP); Japan Cooperation Center for Petroleum and Sustainable Energy, Tokyo (JP)

( * ) Notice: Subject to any disclaimer, the term of this patent is extended or adjusted under 35 U.S.C. 154(b) by 0 days.

(21) Appl. No.: 18/059,524

(22) Filed: Nov. 29, 2022

(51) Int. Cl.
| | | |
|---|---|---|
| *B01J 29/16* | (2006.01) | |
| *B01J 27/18* | (2006.01) | |
| *B01J 35/30* | (2024.01) | |
| *B01J 35/61* | (2024.01) | |
| *B01J 35/63* | (2024.01) | |
| *B01J 35/64* | (2024.01) | |
| *B01J 37/00* | (2006.01) | |
| *B01J 37/02* | (2006.01) | |
| *B01J 37/28* | (2006.01) | |
| *C10G 11/05* | (2006.01) | |
| *C10G 47/20* | (2006.01) | |

(52) U.S. Cl.
CPC ......... *B01J 29/166* (2013.01); *B01J 27/1802* (2013.01); *B01J 35/393* (2024.01); *B01J 35/615* (2024.01); *B01J 35/635* (2024.01); *B01J 35/651* (2024.01); *B01J 37/0009* (2013.01); *B01J 37/0207* (2013.01); *B01J 37/28* (2013.01); *C10G 11/05* (2013.01); *C10G 47/20* (2013.01); *B01J 2229/16* (2013.01); *B01J 2229/183* (2013.01); *B01J 2229/42* (2013.01); *C10G 2300/70* (2013.01)

(58) Field of Classification Search
CPC ...... B01J 27/047; B01J 27/051; B01J 27/055; B01J 27/0515; B01J 27/14; B01J 27/18; B01J 27/182; B01J 27/1802; B01J 27/1853; B01J 27/186; B01J 27/188; B01J 27/19; B01J 27/199; B01J 29/085; B01J 29/088; B01J 29/166; B01J 29/146; B01J 29/89; B01J 2229/16; B01J 2229/18; B01J 2229/183; B01J 2229/186; B01J 2229/20; B01J 2229/42; B01J 37/0009; B01J 37/0207; B01J 37/28; B01J 35/006; B01J 35/0006; B01J 35/1019; B01J 35/1042; B01J 35/1061; B01J 35/1066; B01J 35/1023; B01J 35/1038; C10G 11/05; C10G 47/20; C10G 2300/70
USPC ....... 502/60, 63, 64, 66, 208, 210, 211, 213, 502/216, 222, 74, 79
See application file for complete search history.

(56) References Cited

U.S. PATENT DOCUMENTS

| | | |
|---|---|---|
| 3,240,694 A | 3/1966 | Mason et al. |
| 4,255,288 A | 3/1981 | Cull et al. |
| 4,713,167 A | 12/1987 | Reno et al. |
| 4,950,384 A | 8/1990 | Groeneveld et al. |
| 5,026,472 A | 6/1991 | Hoehn et al. |
| 5,885,440 A | 3/1999 | Hoehn et al. |
| 6,113,775 A | 9/2000 | Christolini et al. |
| 6,132,594 A | 10/2000 | Okazaki et al. |
| 6,217,746 B1 | 4/2001 | Thakkar et al. |
| 6,312,586 B1 | 11/2001 | Kalnes et al. |
| 6,726,834 B2 | 4/2004 | Quesada et al. |
| 8,002,970 B2 | 8/2011 | Euzen et al. |
| 9,221,036 B2 | 12/2015 | Koseoglu et al. |
| 10,081,009 B2 | 9/2018 | Koseoglu et al. |
| 10,293,332 B2 | 5/2019 | Koseoglu et al. |
| 11,433,379 B2* | 9/2022 | Koseoglu ............. C07C 5/2735 |
| 2009/0118556 A1 | 5/2009 | Euzen et al. |
| 2022/0008908 A1* | 1/2022 | Koseoglu ................. B01J 37/30 |

FOREIGN PATENT DOCUMENTS

| | | |
|---|---|---|
| JP | H07-308581 | 11/1995 |
| JP | 2000-334305 A | 12/2000 |

(Continued)

OTHER PUBLICATIONS

International Search Report and Written Opinion in Corresponding PCT Application No. PCT/US2023/081305, mailed Mar. 1, 2024; 9 pages.

*Primary Examiner* — Elizabeth D Wood
(74) *Attorney, Agent, or Firm* — Leason Ellis LLP (57) ABSTRACT

Hydrotreating catalysts are provided having one or more phosphorus components carried on a composite support of a titanium-loaded binder component and post-framework modified ultra-stable Y-type zeolite. The support comprises the titanium-loaded binder component and a post-framework modified ultra-stable Y-type (USY) zeolite in which a portion of aluminum atoms constituting a zeolite framework thereof is substituted with zirconium atoms and/or titanium atoms and/or hafnium atoms. The active components including the phosphorous active component and one or more hydrocracking metals active components loaded on the support.

14 Claims, 2 Drawing Sheets

(56) References Cited

FOREIGN PATENT DOCUMENTS

| | | |
|---|---|---|
| JP | 2002-255537 A | 9/2002 |
| JP | 2003-226519 A | 8/2003 |
| WO | 2007032232 A1 | 3/2007 |
| WO | 20220010520 A1 | 1/2022 |
| WO | 20230141407 A1 | 7/2023 |

* cited by examiner

HYDROCRACKING CATALYST FOR HYDROCARBON OIL INCLUDING TITANIA BINDER AND PHOSPHOROUS ACTIVE COMPONENT, METHOD FOR PRODUCING HYDROCRACKING CATALYST, AND METHOD FOR HYDROCRACKING HYDROCARBON OIL

RELATED APPLICATIONS

Not applicable.

BACKGROUND

Field of the Invention

The present disclosure relates to hydrocracking catalysts including zeolite of the USY-type, catalyst manufacturing processes, and methods of hydrocracking hydrocarbon oil.

Description of Related Art

Hydrocracking processes are used commercially in a large number of petroleum refineries. They are used to process a variety of feeds, for example boiling in the range of about 3700 to about 5200 in conventional hydrocracking units and boiling above about 520° and above in the residue hydrocracking units. In general, hydrocracking processes split the heavy large molecules of the feed into smaller, that is, lighter, molecules having higher average volatility and economic value. Additionally, hydrocracking processes typically improve the quality of the hydrocarbon feedstock by increasing the hydrogen to carbon ratio and by removing organosulfur and organonitrogen compounds. The significant economic benefit derived from hydrocracking processes has resulted in substantial development of process improvements and more active catalysts.

Hydrotreating and hydrocracking units generally include two principal zones, reaction and separation. Key parameters such as feedstock quality, product specification, processing objectives and catalysts typically determine the configuration of the reaction zone. Mild hydrocracking or single stage once-through hydrocracking occurs at operating conditions that are more severe than hydrotreating processes, and less severe than conventional full pressure hydrocracking processes. This hydrocracking process is more cost effective, but typically results in lower product yields and quality. The mild hydrocracking process produces less middle distillate products of a relatively lower quality as compared to conventional hydrocracking. Single or multiple catalysts systems can be used depending upon the feedstock processed and product specifications. Single stage hydrocracking is the simplest configuration and are designed to maximize middle distillate yield over a single or dual catalyst systems. Dual catalyst systems are used in a stacked-bed configuration or in two different reactors. In a series-flow configuration, the entire hydrotreated/hydrocracked product stream from the first reactor, including light gases including $C_1$-$C_4$, $H_2S$, $NH_3$, and all remaining hydrocarbons, are sent to the second reactor. In two-stage configurations, the feedstock is refined by passing it over a hydrotreating catalyst bed in the first reactor. The effluents are passed to a fractionator column to separate the $H_2S$, $NH_3$, light gases ($C_1$-$C_4$), naphtha and diesel products boiling in the temperature range of 36-370° The hydrocarbons boiling above about 370° are then passed to the second reactor. In a two-stage hydrocracking configuration, the feedstock is hydrotreated/hydrocracked in a first reactor over a hydrotreating catalyst bed, usually comprising amorphous based catalyst(s), such as amorphous alumina or silica alumina substrates containing Co and/or Ni and/or Mo and/or W metals as the active phase. The first reactor effluents are then fractionated, and the light fractions containing $H_2S$, $NH_3$, $C_1$-$C_4$ gases, naphtha and diesel fractions boiling up to a nominal boiling point of about 3700 are separated. The hydrocarbon fraction boiling above about 370° is then sent to the second reactor containing amorphous and/or zeolite-based catalyst(s) having Ni/Mo or Ni/W metals as the active phase. The effluents from the second reactor are sent to the fractionator in a combined stream with effluent from the first reactor, for separation of cracked components.

The use of multiple hydrocracking zones within an overall hydrocracking unit is known. For instance, U.S. Pat. Nos. 3,240,694; 6,113,775; 6,113,775; 6,217,746; 6,312,586; 5,885,440, 5,026,472; 4,713,167; 4,950,384 illustrates a hydrocracking process with different configurations.

Catalysts including hydrotreating/hydrocracking catalysts, such as pretreat catalysts, typically comprise an amorphous based catalyst(s), such as amorphous alumina or silica-alumina or titania substrates containing active metals, Ni/Mo, Ni/W or Co/Mo metals as the active phase, or amorphous catalyst, zeolite catalyst, or a composite mixture thereof, promoted with Ni, W, Mo and Co metals. A commonly used zeolite is ultra-stable Y (hereafter "USY") zeolite. The hydrocracking cracking catalysts include a hydrogenative-active metal component and an acidic support component. In certain embodiments, hydrocracking catalyst includes any one of amorphous alumina catalysts, amorphous silica-alumina catalysts, titania catalysts, natural or synthetic zeolite-based catalyst, a post modified zeolite, or a combination thereof. The hydrocracking catalyst can possess an active phase material including, in certain embodiments, any one of or combination including Ni, W, Mo, Co or a combination thereof. In certain embodiments in which an objective is hydrodenitrogenation, acidic alumina or silica alumina-based catalysts loaded with Ni—Mo, or Ni—W active metals, or combinations thereof, are used. In embodiments in which the objective is to remove all nitrogen and to increase the conversion of hydrocarbons, silica alumina, zeolite or combination thereof are used as catalysts, with active metals including Ni—Mo, Ni—W or combinations thereof.

U.S. Pat. Nos. 9,221,036, 10,081,009 and 10,293,332 (the '036, '009 and '332 patents, or the '036 patent family), which are owned by the Applicants of the present invention and are incorporated by reference in their entireties, teach, inter alia, hydrocracking catalysts in which a USY framework has been substituted, in part, by one or more of zirconium, titanium, and hafnium. In these catalysts, the substituting metal (Ti, Zr, and/or Hf) substitutes for part of the aluminum in the aluminum/silica framework, and essentially become part of the framework. Processes for making these catalysts and their use, are all described in the '036, '009 and '332 patents.

In regard to the above background information, the present disclosure is directed to provide a technical solution for an alternative catalyst material, including as catalysts used in hydrocracking of hydrocarbon oil.

SUMMARY OF THE INVENTION

A hydrocracking catalyst for hydrocarbon oil is provided comprising: a support comprising a post-framework modified ultra-stable Y-type (USY) zeolite component and a binder component, the binder component comprising about 5-10 W % titania relative to the total mass of the binder component and one or more additional inorganic oxides; and active components including a phosphorous active component and one or more hydrocracking metal active components loaded on said support.

In certain embodiments, the binder component comprises an amorphous binary composite of alumina-titania or an amorphous ternary composite of alumina-silica-titania. In certain embodiments, the binder component further comprises about 5-10 W % silica, and about 80-90 W % alumina, each relative to the total mass of the binder component.

In certain embodiments of the hydrocracking catalyst, the phosphorous active component comprises about 0.01-5.0 W % of the relative to the total mass of the hydrocracking catalyst. In certain embodiments the hydrocracking catalyst comprises about 1.0-3.0 W % of the phosphorus active component relative to the total mass of the hydrocracking catalyst.

In certain embodiments, the hydrocracking catalyst includes, as one or more hydrocracking metal active components, one or more metals or metal compounds (oxides or sulfides) selected from the Periodic Table of the Elements IUPAC Groups 6, 7, 8, 9 and 10. In certain embodiments, the hydrocracking catalyst includes, one or more metals or metal compounds (oxides or sulfides) of Mo, W, Co or Ni.

In certain embodiments, the hydrocracking catalyst has a specific surface area of 200 to 450 m$^2$/g; a volume of pores having a diameter of 600 Å or less of 0.40 to 0.75 ml/g; and wherein the amount of the phosphorus component comprises 0.01-5.0 W % relative to the mass of the catalyst material.

In certain embodiments, the hydrocracking catalyst as described herein is in the form of extrudates, wherein said extrudates are calcined.

In certain embodiments, the post-framework modified USY zeolite comprise one or more of titanium, zirconium and/or hafnium substituting aluminum atoms constituting a zeolite framework of the USY zeolite. In certain embodiments, the post-framework modified USY zeolite is substituted with 0.1-5 W % zirconium atoms and 0.1-5 W % titanium ions calculated on an oxide basis. In certain embodiments, the post-framework modified USY zeolite comprise titanium and zirconium substituting aluminum atoms constituting a zeolite framework of the USY zeolite. In certain embodiments, the post-framework modified USY zeolite is substituted with 0.1-5 W % zirconium atoms and 0.1-5 W % titanium ions calculated on an oxide basis. In certain embodiments, wherein the post framework-substituted USY zeolite has the following characteristics: (a) a crystal lattice constant of 2.430 to 2.450 nm, (b) a specific surface area of 600 to 900 m$^2$/g, and (c) a molar ratio of $SiO_2$ to $Al_2O_3$ of 10 to 100.

A method for making hydrocracking catalyst particles is provided, comprising: providing post-framework modified ultra-stable Y-type (USY) zeolite component in which a portion of aluminum atoms constituting a zeolite framework thereof is substituted with zirconium atoms and/or titanium atoms and/or hafnium atoms; providing a titania-containing binder component; mixing and kneading the post-framework modified USY zeolite component with the titania-containing binder component to form a composite; forming the composite into extrudates; thermally treating the extrudates; recovering intermediate calcined catalyst particles that are characterized by outer surfaces and pores which define inner surfaces; and loading active components comprising a phosphorus component and one or more hydrocracking metal active components.

In certain embodiments the method for making hydrocracking catalyst comprises loading active components on outer surfaces and/or on pore inner surfaces of the intermediate calcined catalyst particles, the process further comprising thermally treating active component loaded intermediate calcined catalyst particles, and recovering final calcined catalyst particles. In certain embodiments the method for making hydrocracking catalyst comprises loading active components on outer surfaces and/or on pore inner surfaces of the titania-containing binder component, the process further comprising thermally treating active component loaded intermediate calcined catalyst particles, and recovering final calcined catalyst particles. In certain embodiments loading of active components comprises loading active components on outer surfaces and/or on pore inner surfaces of the composite of the titania-containing binder component and the post-framework modified USY zeolite component, the process further comprising thermally treating active component loaded intermediate calcined catalyst particles, and recovering final calcined catalyst particles.

In certain embodiments the method for making hydrocracking catalyst comprises using a titania-containing binder component formed from titania, silica and alumina precursors wherein titania precursors are selected from the group consisting of $Ti(OH)_4$, $TiO(OH)_2$, $TiO_2$, $Ti(C_2O_4)_2$, $TiSO_4$ or $Ti(SO_4)_2$ and combinations including two or more of the titania precursors; wherein alumina precursors are selected from the group consisting of $NaAlO_2$, $Al_2(SO_4)_3$, aluminates, alumina, aluminum colloids, boehmites, pseudoboehmites, aluminum hydroxides, aluminum salts, aluminum alkoxides, alumina gels and combinations including two or more of the alumina precursors; and wherein silica precursors are selected from the group consisting of $Na_2SiO_3$, $Na_4SiO_4$, sodium silicate (water glass), fumed silica, precipitated silica, colloidal silica, silica gels, silicon hydroxides, silicon alkoxides and combinations including two or more of the silica precursors.

In certain embodiments the phosphorus component is loaded on the calcined catalyst particles. In certain embodiments the phosphorus component and the one or more hydrocracking metal active components are loaded on the intermediate calcined catalyst particles. In certain embodiments the phosphorus component is loaded on the titania-containing binder component. In certain embodiments the phosphorus component and the one or more hydrocracking metal active components are loaded on the titania-containing binder component. In certain embodiments the phosphorus component is loaded on the composite of the post-framework modified USY zeolite component and the titania-containing binder component. In certain embodiments the phosphorus component and the one or more hydrocracking metal active components are loaded on the composite of the post-framework modified USY zeolite component and the titania-containing binder component.

A method for hydrocracking hydrocarbon oil is provided, comprising hydrocracking hydrocarbon oil with the hydrocracking catalyst described herein. In certain embodiments the method further comprises: filling a hydrotreating apparatus which is a flow reactor with the hydrocracking catalyst; and treating a hydrocarbon oil having a boiling point in the range of about 370-833° C. in the presence of hydrogen at a reactor temperature in the range of about 300-500° C., a hydrogen pressure in the range of about 40-300 bar, a liquid hourly space velocity in the range of about 0.1-10 h$^{-1}$, and a hydrogen/oil ratio in the range of about 500-2500 Nm³/m³. In certain embodiments the method further comprises: filling a hydrotreating apparatus which is a flow reactor with the hydrocracking catalyst; and treating a hydrocarbon oil having a boiling point in the range of about 370-650° C. in the presence of hydrogen at a reactor temperature in the range of about 330-450° C., a hydrogen pressure in the range of about 70-150 bar, a liquid hourly space velocity in the range of about 0.2-1.5 h⁻¹, and a hydrogen/oil ratio in the range of about 1000-2500 Nm³/m³, wherein effluent from the flow reactor comprises middle distillates including kerosene and gas oil. In certain embodiments the flow reactor of the above methods is selected from the group consisting of a stirred tank, an ebullient bed reactor, a baffled slurry tank, a fixed bed reactor, a rotating tubular reactor and a slurry-bed reactor. In certain embodiments the hydrocarbon oil comprises refined oil obtained from (1) crude oil, (2) synthetic crude oil, (3) bitumen, (4) oil sand, (5) shale oil, (6) coal liquid, (7) plastic pyrolysis oil and/or (8) bio-mass derived oils. In certain embodiments the hydrocarbon oil comprises refined oil obtained from crude oil, synthetic crude oil, bitumen, oil sand, shale oil or coal oil, and said refined oil is a) atmospheric gas oil (AGO), b) vacuum gas oil (VGO), c) deasphalted oil (DAO) obtained from a solvent deasphalting process or demetallized oil, d) light coker gas oil or heavy coker gas oil obtained from a coker process, e) cycle oil obtained from a fluid catalytic cracking (FCC) process, f) gas oil obtained from a visbreaking process; g) gas oil obtained from plastic pyrolysis oils; and/or h) bio-mass derived gas oils; wherein any of the feeds c) through h) include nominal boiling point ranges coinciding with that of atmospheric gas oil or vacuum gas oil. In certain embodiments the method further comprises: filling a hydrotreating apparatus which is a flow reactor with the hydrocracking catalyst; and treating a hydrocarbon oil having a boiling point of 375° C. to 650° C. in the presence of hydrogen at a reactor temperature of 330° C. to 450° C., a hydrogen pressure of 7 to 15 MPa, a liquid hourly space velocity (LHSV) of 0.2 to 1.5 h⁻¹, and a hydrogen/oil ratio of 1000 to 2000 Nm³/m³ to afford kerosene-gas oil.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS

Hydrotreating catalysts are provided having one or more phosphorus components carried on a composite support of a titanium-loaded binder component and post-framework modified ultra-stable Y-type zeolite. The support comprises the titanium-loaded binder component and a post-framework modified ultra-stable Y-type (USY) zeolite in which a portion of aluminum atoms constituting a zeolite framework thereof is substituted with zirconium atoms and/or titanium atoms and/or hafnium atoms. The active components including the phosphorous active component and one or more hydrocracking metals active components loaded on the support.

In certain embodiments the disclosure provides a composite catalyst material and/or catalyst particles comprising one or more phosphorus components carried on a composite of a titanium-loaded binder component and framework-modified USY zeolite in which some of the aluminum atoms in the framework are substituted with zirconium atoms and/or titanium atoms and/or hafnium atoms. The titanium component of the titanium-loaded inorganic oxide is incorporated prior to mixing the inorganic oxide with the post-framework modified USY zeolite. A composite mixture of the titanium-binder composite and the post-framework modified USY zeolite is extruded to form catalyst intermediate particles; the catalyst intermediate particles are thermally treated to produce calcined catalyst intermediate particles. In certain embodiments the one or more phosphorus components are incorporated after formation of the calcined catalyst intermediate particles. In certain embodiments the one or more phosphorus components are incorporated with the composite mixture of the titanium-binder sub-composite and the post-framework modified USY zeolite. In certain embodiments the one or more phosphorus components are incorporated with the post-framework modified USY zeolite prior to forming a composite mixture of the titanium-binder sub-composite and the post-framework modified USY zeolite. In certain embodiments, the one or more phosphorus components are incorporated in two or three of (a) after formation of the calcined catalyst intermediate particles; (b) with the composite mixture of the titanium-binder sub-composite and the post-framework modified USY zeolite; and (c) with the post-framework modified USY zeolite prior to forming a composite mixture of the titanium-binder sub-composite and the post-framework modified USY zeolite. Optionally, the catalyst particles, having a titanium component integrated with the titanium-binder sub-composite, and the one or more phosphorus components integrated with the particles, are thermally treated to produce calcined catalyst particles.

In certain embodiments the disclosure provides methods for manufacturing catalyst materials comprising one or more phosphorus components carried on a composite of a titanium-loaded binder component and framework-modified USY zeolite in which some of the aluminum atoms in the framework are substituted with zirconium atoms and/or titanium atoms and/or hafnium atoms. The material is a composite of (a) a binder component as a granulating agent or binder material that contains a titanium component, and (b) a post-framework modified USY zeolite component in which some of the aluminum atoms in the framework are substituted with zirconium atoms and/or titanium atoms and/or hafnium atoms; wherein the material is impregnated with one or more phosphorus components. In the present processes, the titanium component is incorporated in the binder material prior to forming the catalyst particles. In embodiments of the present processes the titanium component is incorporated prior to mixing the binder with a post-framework modified USY zeolite, extruding the resulting composite mixture, and forming the catalyst particles. One or more phosphorus components are added to the post-framework modified USY zeolite component, the composite of the post-framework modified USY zeolite and the binder component containing a titanium component, and/or particles formed from the composite material; and the wherein the particles loaded with one or more phosphorus components are calcined.

In certain embodiments, catalyst particles formed according to the invention herein are suitable for hydrocracking a heavy hydrocarbon oil obtained from crude oil, synthetic crude oil, bitumen, oil sand, shale oil, coal liquid, plastic pyrolysis oil and/or bio-mass derived oils. The above heavy hydrocarbon oil is preferably any of a) atmospheric gas oil (AGO), b) vacuum gas oil (VGO), c) deasphalted oil (DAO) obtained from a solvent deasphalting process or demetallized oil, d) light coker gas oil or heavy coker gas oil obtained from a coker process, e) cycle oil obtained from a fluid catalytic cracking (FCC) process, f) gas oil obtained from a visbreaking process; g) gas oil obtained from plastic pyrolysis oils; or h) bio-mass derived gas oils; wherein any of the feeds c) through h) include nominal boiling point ranges coinciding with that of atmospheric gas oil or vacuum gas oil.

Figure 1:
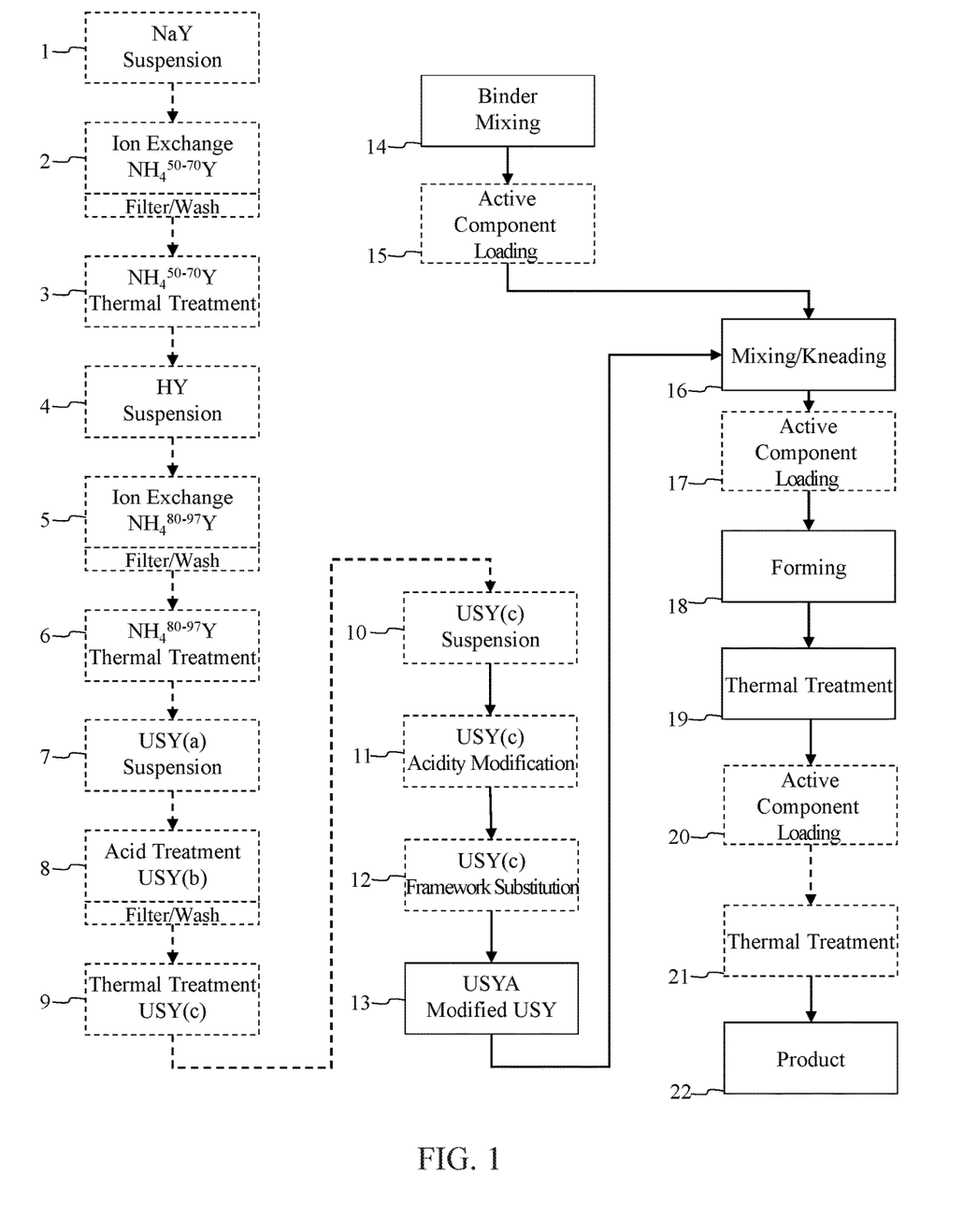
FIG. 1 is a process flow diagram showing steps for producing catalyst particles including post-framework modified USY zeolite, a titania-containing binder component and phosphorus as an active component.

FIG. 1 shows process steps for producing a post-framework modified USY zeolite, and for producing catalyst particles having active components on a composite support including the post-framework modified USY zeolite and a binder according to embodiments here. In one embodiment of a preparation method, the framework modified USY zeolite is prepared and/or provided. A binder is provided, for instance in a slurry form, including a titania component. The post-framework modified USY zeolite and the titania-containing binder component are mixed at the desired ratio and kneaded to form a composite uniform mixture of the materials. The mixture containing the post-framework modified USY zeolite and the titanium-loaded binder component is then extruded and calcined to form the intermediate catalyst particles. The active components, including a phosphorus component and one or more other active components, are loaded on the intermediate catalyst particles. Alternatively, or in combination, active components, including a phosphorus component and one or more other active components are loaded at one or more prior steps, for example during forming of the titania-containing binder component, after forming of the titania-containing binder component, and/or during the step of mixing and kneading of the framework modified USY zeolite and the titania-containing binder component.

Steps 1-9 herein provide a description of a process for the synthesis of calcined USY zeolite (denoted as USY(c) herein), which is then post-framework modified at steps 10-13 (denoted as USYA herein). In embodiments herein of the present invention, the USYA can be obtained from another source and provided at step 13 as wet, dry (uncalcined) or calcined zeolite material. Accordingly, steps 1-12 are shown in dashed lines as optional if the USYA is provided for synthesis of catalyst particles herein.

Steps 14 and optional step 15 concern preparation of an inorganic oxide as a binder or granulating agent, and steps 16-22 concern forming composite catalyst support particles (steps 16-19) (optionally bypassing loading of active component, step 17) and loading composite catalyst support particles with an effective quantity of active component (steps 20-21, wherein these can be bypassed if active component is loaded in a preceding step). Active component can be loaded at either of both of steps 17/20.

At step 1, a Y-type zeolite (Na—Y) is prepared by forming a suspension of an effective concentration of Na—Y, for instance in a liquid/solid ratio range of about 5-20, 5-15, 8-15, 5-12 or 8-12 liters (L) of water per kilogram (kg) of zeolite, and at an effective temperature, for instance in a range of about 15-95, 15-80, 20-95, 20-90, 20-80, 40-95, 40-90 or 40-80° C. The starting material at step 1 comprising a Na—Y-type zeolite having an effective $SiO_2/Al_2O_3$ molar ratio (SAR), for example in the range of about 3-6; an effective unit cell dimension (UD), for instance of about 2.466 nanometers (nm), an effective specific surface area (SA), for example in the range of about 600-900, 600-800, 650-900 or 650-800 square meters per gram (m$^2$/g), and an effective $Na_2O$ content, for instance of about 13 W %.

In an ion exchange step 2, a first ion-exchanged Y-type zeolite is synthesized by subjecting the Na—Y suspension from step 1 to ion exchange of sodium ions of the Na—Y with ammonium ions to prepare the first ion-exchanged Y-type zeolite (first NH$_4$—Y). In the first NH$_4$—Y, about 50-70% of Na contained in the Y-type zeolite is substituted with NH$_4$ for certain embodiments, also referred to as NH$_4^{50-70}$Y. An embodiment of the ion exchange at step 2 includes addition to the Na—Y suspension of: an effective concentration of an ammonium source, for instance a molar ratio of ammonium to Al in the range of about 2-8; at an effective temperature in a range of about 20-95, 20-90, 20-80, 40-95, 40-90 or 40-80° C.; and for an effective residence time, for instance in a range of about 10-600, 10-180, 30-600 or 30-180 minutes. The ammonium source can be one or more of NH$_4$OH, (NH$_4$)$_2$SO$_4$, (NH$_4$)$_2$CO$_3$, or another suitable ammonium source.

The resulting solids from the ion exchange step 2 can be filtered, washed with water at an effective temperature, for instance in a range of about 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to obtain the first ion-exchanged NH$_4$—Y, NH$_4^{50-70}$Y. Optionally, after washing the resulting solids from the ion exchange step 2, they can be washed in one or more additional cycles with an ammonium source followed by water washing, at effective temperatures, concentrations and residence times such as those at step 2. The solids matter that is washed one or more additional times is dried at effective temperatures and residence times such as those at step 2, to obtain the first ion-exchanged NH$_4$—Y, NH$_4^{50-70}$Y. In certain instances, the one or more additional cycles of the first ion exchange step are not implemented.

In a thermal treatment step 3, a hydrogen type Y-type (HY) zeolite is synthesized from the first ion-exchanged NH$_4$—Y (NH$_4^{50-70}$Y) by heating in a saturated steam atmosphere. In certain embodiments the thermal treatment at step 3 comprises calcining the first ion-exchanged NH$_4$—Y at an effective temperature and for a time effective to produce HY zeolite, for instance with a temperature in a range of about 500-800, 500-700, 600-800 or 600-700° C. (typically in the presence of steam, that is, in a saturated water vapor, or in the presence of air or oxygen) and for a time range of about 10-600, 10-180, 30-600 or 30-180 minutes. In certain embodiments, if there remains a substantial amount of Na in the HY zeolite, ion exchange may be repeated one or more times as in step 2. The HY zeolite is converted to USY following additional ammonium ion exchange and steaming treatment discussed below at steps 4-6.

At steps 4-6, the HY zeolite is treated to synthesize a second ion-exchanged NH$_4$—Y zeolite having 80-97% of Na contained in the Na—Y exchanged with NH$_4$, also referred to as NH$_4^{80-97}$Y For instance, as depicted, at step 4 a suspension is prepared containing an effective concentration of HY zeolite, for instance in a solid/liquid mass ratio range of about 5-20, 5-15, 8-15, 5-12 or 8-12 L/kg (water/zeolite), and at an effective temperature, for instance in a range of about 15-95, 15-80, 20-95, 20-90, 20-80, 40-95, 40-90 or 40-80° C.

In an ion exchange step 5, a second ion-exchanged Y-type zeolite is synthesized by subjecting the $NH_4$—Y suspension from step 4 to ion exchange of 80-97 or 90-97% sodium ions of the Na—Y with ammonium ions to prepare a second ammonium-exchanged Y-type zeolite (second $NH_4$—Y). $NH_4^{80-97}Y$. An embodiment of the ion exchange at step 5 includes addition and stirring of an effective concentration of an ammonium, for instance a molar ratio of ammonium to Al in the range of about 2-8; at an effective temperature in a range of about 20-95, 20-90, 20-80, 40-95, 40-90 or 40-80° C.; and for an effective residence time, for instance in a range of about 10-600, 10-180, 30-600 or 30-180 minutes. The ammonium source can be one or more of $NH_4OH$, $(NH_4)_2SO_4$, $(NH_4)_2CO_3$, or another suitable ammonium source.

The resulting solids from the ion exchange step 5 can be filtered, washed with water at an effective temperature, for instance in a range of about 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to obtain the second ion-exchanged $NH_4$—Y, $NH_4^{80-97}Y$. Optionally, after washing the resulting solids from the ion exchange step 5, they can be washed in one or more additional cycles with an ammonium source followed by water washing, at effective temperatures, concentrations and residence times such as those at step 5. The solids washed one or more additional times are dried at effective temperatures and residence times such as those at step 5, to obtain the second ion-exchanged $NH_4$—Y, $NH_4^{80-97}Y$ In certain instances, the one or more additional cycles of the second ion exchange step are not implemented.

In a thermal treatment step 6, a first ultra-stable Y-type zeolite, referred to herein as USY(a), is synthesized by calcining the $NH_4^{80-97}Y$ Thermal treatment at step 6 comprises calcining the second ion-exchanged $NH_4$—Y at an effective temperature, for instance in a range of about 500-800, 500-700, 600-800 or 600-700° C. (typically in the presence of steam, that is, in a saturated water vapor, or in the presence of air or oxygen) and for a time range of about 10-600, 10-180, 30-600 or 30-180 minutes, to recover USY(a). In certain embodiments the thermal treatment of the $NH_4^{80-97}Y$ is by steaming. The USY(a) from step 6 is USY zeolite that possesses a SAR that is approximately equivalent to that of the starting Na—Y The steps 1-6 should generally not significantly change the SAR value, because these steps to not entail acid treatment to target ejection of aluminum atoms from the zeolite framework. For example, the USY(a) thus obtained at step 6 can have a SAR of about 3-6.

At steps 7-9, the USY(a) zeolite is treated to synthesize calcined USY zeolite having an increased SAR, which is the starting material for subsequent post-framework modification. At step 7, an aqueous suspension is prepared containing an effective concentration of the USY(a), for instance in a solid/liquid mass ratio range of about 5-20, 5-15, 8-15, 5-12 or 8-12 L/kg (water/zeolite), and at an effective temperature, for instance in a range of about 15-95, 15-80, 20-95, 20-90, 20-80, 40-95, 40-90 or 40-80° C.

In an acid treatment step 8, an effective quantity of an inorganic acid or an organic acid is dispersed in the suspension so that a pH of the suspension is maintained in a strongly acidic range to synthesize a second ultra-stable Y-type zeolite, referred to herein as USY(b), having an increased SAR. Extraskeletal aluminum (aluminum atoms which do not form part of the zeolite framework) are removed from the USY(a) in order to obtain the USY(b) zeolite. This is carried out by acid treatment. The inorganic acid use can generally be sulfuric acid, nitric acid, hydrochloric acid and the like. In certain embodiments the selected inorganic acid is sulfuric acid or hydrochloric acid. Further, carboxylic acids can suitably be used as the organic acid described above. The amount of the inorganic acid or the organic acid added is the amount suitable to control the pH of the suspension in a strongly acidic range, for instance less than about 2.0 or 2.5, for example in a range of about 0.7-2.5, 0.7-2.0, 1.0-2.5 or 1.0-2.0. The amount may be, for example, a 0.5-4.0-fold, 0.5-3.5-fold, 0.7-4.0-fold or 0.7-3.5-0.5-fold molar increase based on an amount of $Al_2O_3$ in the USY(a). The acidic suspension is maintained at an effective temperature, for instance 15-95, 15-80, 20-95, 20-90, 20-80, 40-95, 40-90 or 40-80° and maintained for an effective residence time, for instance in a range of about 10-600, 10-180, 30-600 or 30-180 minutes. Acid treatment at step 8 increases the SAR of the Y-type zeolite, for example, from a range of about 3-6 to a range of about 30-100, 40-100, 30-80 or 40-80.

The resulting solids from the acid treatment step 8 can be filtered, washed with water at an effective temperature, for instance in a range of about 15-95, 15-80, 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to recover USY(b). Optionally, after washing the resulting solids from the acid treatment step 8, they can be treated in one or more additional cycles with an inorganic acid or organic acid followed by water washing, at effective temperatures, concentrations and residence times such as those at step 8. The solids which are acid-treated one or more additional times are dried at effective temperatures and residence times such as those at step 8, to recover USY(b). In certain instances, the one or more additional cycles of the first acid treatment step are not implemented.

In a thermal treatment step 9, the USY(b) zeolite is subjected to thermal treatment to prepare a third ultra-stable Y-type zeolite, USY(c). In certain embodiments the thermal treatment at step 9 comprises calcining the second USY zeolite (USY(b)) at effective temperatures, for example in a range of about 500-700, 550-700, 500-650 or 550-650° C. (typically in the presence of air or oxygen, or in the presence of steam), and for a time range of about 10-600, 10-180, 30-600 or 30-180 minutes, to recover USY(c). If the calcining temperature is lower than about 500° C., the framework substitution amount of zirconium atoms and/or titanium atoms and/or hafnium atoms tends to be reduced; at calcining temperatures that exceed about 700° C., the specific surface area of the ultra-stable Y-type zeolite can be reduced, and a framework substitution amount of zirconium atoms and/or titanium atoms and/or hafnium atoms is thus reduced.

At steps 10-13 framework substitution is carried out to produce the post-framework modified USY zeolite having a portion of the aluminum atoms within the USY zeolite framework are substituted with zirconium and/or titanium and/or hafnium atoms. In certain embodiments, a post-framework modified USY zeolite material is produced by firing a USY zeolite having the properties described herein at about 500-700° C. A suspension is formed containing the fired USY zeolite, the suspension having a liquid/solid mass ratio of about 5-15. An inorganic acid or an organic acid is added so that a pH of the suspension is about <2.0. Subsequently a solution containing a zirconium compound and/or a titanium compound and/or a hafnium compound is mixed. The solution is neutralized with, for example, an aqueous ammonia, so that the pH of the mixed solution is about 7-7.5.

Suitable zirconium compounds described above include one or more of zirconium sulfate, zirconium nitrate, zirconium chloride and the like. In certain embodiments zirconium sulfate and/or zirconium nitrate are selected. The quantity of the zirconium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, zirconium oxide) and as measured relative to the mass of the post-framework modified USY zeolite component. Addition of the zirconium compound in an amount of less than about 0.1 W % fails to improve solid acid characteristics of the zeolite. The addition of the zirconium compound in an amount exceeding 5 W % tends to cause clogging of pores of the zeolite. An aqueous solution of a zirconium compound prepared by dissolving the zirconium compound in water can be used as the zirconium compound.

Suitable titanium compounds include one or more of titanium sulfate, titanium acetate, titanium chloride, titanium nitrate, and titanium lactate. In certain embodiments titanium sulfate and/or titanium acetate are selected. The quantity of the titanium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, titanium oxide) and as measured relative to the mass of the post-framework modified USY zeolite component. Addition of the titanium compound in an amount of less than about 0.1 W % fails to improve solid acid characteristics of the zeolite. The addition of the titanium compound in an amount exceeding 5 W % tends to cause clogging of pores of the zeolite. An aqueous solution of a titanium compound prepared by dissolving the titanium compound in water can be used as the titanium compound.

Suitable hafnium compounds described above include one or more of hafnium chloride, hafnium nitrate, hafnium fluoride, hafnium bromide, hafnium oxalate and the like. In certain embodiments hafnium chloride and/or hafnium nitrate are selected. The quantity of the hafnium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, hafnium oxide) and as measured relative to the mass of the post-framework modified USY zeolite component. Addition of the hafnium compound in an amount of less than about 0.1 W % fails to improve solid acid characteristics of the zeolite. The addition of the hafnium compound in an amount exceeding 5 W % tends to cause clogging of pores of the zeolite. An aqueous solution of a hafnium compound prepared by dissolving the hafnium compound in water can be used as the hafnium compound.

A pH of the above suspension is controlled to about <2.0 to prevent a precipitate from being generated during mixing of the aqueous solution of the zirconium compound and/or the hafnium compound and/or the titanium compound with a suspension of the ultra-stable Y-type zeolite described above. Mixing of the aqueous solution of the zirconium compound and/or the hafnium compound and/or the titanium compound with a suspension of the ultra-stable Y-type zeolite is, in certain embodiments, is conducted by gradually adding said aqueous solution to the suspension. After completion of addition of the aqueous solution described above to the suspension, the solution can be mixed by stirring at a suitable temperature such as about 20-40 or 25-35° C. for about 3-5 hours. Further, after completion of the above-described mixing, the admixed solution is neutralized by adding an alkali compound such as aqueous ammonia and/or the like, so that a pH thereof is controlled to about 7.0-7.5, whereby the post-framework modified USY zeolite described herein is be obtained.

In this regard: when only the zirconium compound (or an aqueous solution thereof) is used as the compound (or an aqueous solution thereof) and added to the suspension described above, the post-framework modified USY zeolite (Zr—USY) in which zirconium atoms are substituted for a part of aluminum atoms forming the framework of the ultra-stable Y-type zeolite is formed; when only the titanium compound (or an aqueous solution thereof) is used, the post-framework modified USY zeolite (Ti—USY) in which titanium atoms are substituted for a part of aluminum atoms forming the framework of the ultra-stable Y-type zeolite is formed; when only the hafnium compound (or an aqueous solution thereof) is used, the post-framework modified USY zeolite (Hf—USY) in which hafnium atoms are substituted for a part of aluminum atoms forming the framework of the ultra-stable Y-type zeolite is formed; when the zirconium compound and the titanium compound (or aqueous solutions thereof) are used, the post-framework modified USY zeolite in the catalyst (Zr—Ti—USY) in which zirconium atoms and titanium atoms are substituted for a part of aluminum atoms forming the framework of the ultra-stable Y-type zeolite is formed; when the zirconium compound and the hafnium compound (or aqueous solutions thereof) are used, the post-framework modified USY zeolite in the catalyst (Zr—Hf—USY) in which zirconium atoms and hafnium atoms are substituted for a part of aluminum atoms forming the framework of the ultra-stable Y-type zeolite is formed; when the hafnium compound and the titanium compound (or aqueous solutions thereof) are used, the post-framework modified USY zeolite in the catalyst (Hf—Ti—USY) in which hafnium atoms and titanium atoms are substituted for a part of aluminum atoms forming the framework of the ultra-stable Y-type zeolite is formed; and when the zirconium compound, the titanium compound and the hafnium compound (or aqueous solutions thereof) are used, the post-framework modified USY zeolite in the catalyst (Zr—Ti—Hf—USY) in which zirconium atoms, titanium atoms and hafnium atoms are substituted for a part of aluminum atoms forming the framework of the ultra-stable Y-type zeolite is formed.

The resulting framework-substituted zeolite can be filtered, if desired, washed with water, and dried at about 80-180° C.; the mixture may be quasi-equilibrated with steam, for instance, at a temperature of from about 600-800° C. for about 10-20 hours. For instance, at step 10, the calcined USY(c) zeolite from step 9 is prepared for acid treatment by forming a suspension of an effective concentration USY(c), for instance in a liquid/solid mass ratio range of about 5:1-15:1, 5:1-12:1, 8:1-15:1 or 8:1-12:1, by dispersion in water at an effective temperature, for example, in the range of about 15-95, 15-80, 20-95, 20-90, 20-80, 40-95, 40-90 or 40-80° C.

In an acid treatment step 11, an effective quantity of an inorganic acid or an organic acid is dispersed in the suspension so that a pH of the suspension is maintained in a strongly acidic range to prepare the zeolite for metal insertion in the framework, step 12. In certain embodiments, this can be stepwise as in the '036 patent family. In additional embodiments, for example as disclosed in commonly owned US20210077985A1 which is incorporated by reference herein in its entirety, acid treatment to prepare the zeolite for metal insertion in the framework can occur together with the metal insertion. The inorganic acid use can generally be sulfuric acid, nitric acid, hydrochloric acid and the like. In certain embodiments the selected inorganic acid is sulfuric acid or hydrochloric acid. Further, carboxylic acids can suitably be used as the organic acid described above. The amount of the inorganic acid or the organic acid added is the amount suitable to control the pH of the suspension in a strongly acidic range, for instance less than about 2.0 or 2.5, for example in a range of about 0.7-2.5, 0.7-2.0, 1.0-2.5 or 1.0-2.0. The acidic suspension is maintained at an effective temperature, for instance in the range of about 15-80, 15-60, 15-35, 15-30 or 20-60° C. and maintained for an effective residence time, and maintained for an effective residence time, for instance in a range of about 10-600, 10-180, 30-600 or 30-180 minutes.

In a metal insertion step 12, the framework substitution is carried out. The acid-modified USY(c) zeolite suspension is subjected to metals treatment to substitute some of the aluminum atoms forming the framework of the ultra-stable Y-type zeolite. In certain embodiments, this is carried out by adding to the acidity modified USY(c) a solution containing transition metal compounds. In certain embodiments the transition metal compounds comprise a zirconium compound and/or a titanium compound and/or a hafnium compound. The solution is maintained at an effective temperature, for instance 15-80, 15-60, 15-35, 15-30, 20-60, 15-35 or 15-30° C. and for an effective residence time, for instance in a range of about 10-600, 10-180, 30-600 or 30-180 minutes. The suspension from step 12 can be neutralized with, for example, an aqueous ammonia, to a pH in the range of about 7.0-7.5. The resulting solids from the metal insertion step 12 can be filtered, washed with water at an effective temperature, for instance in a range of about 15-95, 15-80, 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, and the post-framework modified USY zeolite (USYA) is recovered at step 13.

Ultra-stable Y-type zeolite is used as the raw materials for preparing the post-framework modified USY zeolite, referred to above as USY(c). As noted above, one or more of the steps 1-9 can be used to prepare the USY introduced at step 10, or otherwise obtained. Said USY introduced at step 10 generally has properties of known USY zeolites, which can be synthesized or modified (as in one or more of the steps 1-9 or alternative methodologies), or sourced, so as to provide a USY zeolite having a SAR in the range of about 30-100, 40-100, 30-80 or 40-80 for effective metal insertion. The known USY-type zeolite refers to zeolite having a unit cell dimension (UD) generally in the range of about 2.425-2.450 or 2.430-2.450 nm; a specific surface area generally in the range of about 600-900, 600-800, 650-900 or 650-800 m$^2$/g; and a pore volume of about 0.3-0.75, 0.4-0.75, 0.3-0.6 or 0.4-0.6 ml/g. Known USY-type zeolites also generally possess a SAR in the range of about 5-100, 10-100, 20-100, 5-80, 10-80, 20-80, 25-100 or 25-80; as noted herein, this SAR can be selected or modified to provide an effective USY for metal insertion. For example, suitable zeolites are FAU framework (zeolite Y) having its micropore pore formed by a 12-membered ring when viewed along the [111] direction is 7.4×7.4 Å. The UD, also referred to as a crystal lattice constant, can be measured by reference to ASTM method D3942, Standard Test Method for Determination of the Unit Cell Dimension of a Faujasite-Type Zeolite. The specific surface area is a value determined by the BET (Brunauer-Emmett-Teller) method using nitrogen adsorption. The ultra-stable Y-type zeolite may be prepared by any method known in the art. This ultra-stable Y-type zeolite is subjected to post-framework modification as described herein to form post-framework modified USY zeolite that is used to produce composite catalyst particles.

The post-framework modified USY zeolite incorporates one or more of zirconium, titanium, and hafnium into its framework. Effective concentrations of the Zr, Ti, and/or Hf include about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, ZrO2, TiO2 and/or HfO2) and as measured relative to the mass of the post-framework modified USY zeolite. In certain embodiments, the amounts of individual materials supplying Zr, Ti, and/or Hf can be less than 0.1, 0.2 or 0.3 W %, but when combined, the total is at least 0.1, 0.2 or 0.3 W %. It is appreciated by a person of skill in the art, that when the framework-substituted zeolite in the catalyst contains the zirconium atoms and the titanium atoms and/or the hafnium atoms described above, a mass ratio (in terms of oxides) of the zirconium atoms to the titanium atoms and/or the hafnium atoms is not specifically be restricted, and any ratio of zirconium or titanium or hafnium that is effective for the intended use of the catalyst particles can be used, for example, for hydrocracking of heavy hydrocarbon oil. In certain embodiments the post-framework modified USY zeolite is: a framework-substituted zeolite in which a part of aluminum atoms forming a zeolite framework is substituted only with zirconium atoms, and is referred to as a "zirconium-substituted zeolite" or "Zr—USY"; a framework-substituted zeolite in which a part of aluminum atoms forming a zeolite framework is substituted only with titanium atoms, and is referred to as a "titanium-substituted zeolite" or "Ti—USY"; a framework-substituted zeolite in which a part of aluminum atoms forming a zeolite framework is substituted only with hafnium atoms, and is referred to as a "hafnium-substituted zeolite" or "Hf—USY"; a framework-substituted zeolite in which a part of aluminum atoms forming a zeolite framework is substituted only with zirconium atoms and titanium atoms, and is referred to as a "zirconium-titanium-substituted zeolite" or "Zr—Ti—USY"); a framework-substituted zeolite in which a part of aluminum atoms forming a zeolite framework is substituted only with hafnium atoms and titanium atoms, and is referred to as a "hafnium-titanium-substituted zeolite" or "Hf—Ti—USY"); a framework-substituted zeolite in which a part of aluminum atoms forming a zeolite framework is substituted only with zirconium atoms and hafnium atoms, and is referred to as a "zirconium-hafnium-substituted zeolite" or "Zr—Hf—USY"); and a framework-substituted zeolite in which a part of aluminum atoms forming a zeolite framework is substituted only with zirconium atoms, titanium and hafnium atoms, and is referred to as "zirconium-titanium-hafnium substituted zeolite" or "Zr—Ti—Hf—USY."

The presence of the zirconium atoms and/or titanium and/or hafnium atoms which are substituted for the aluminum atoms in the post-framework modified USY zeolite serve as constituents of the framework of the USY zeolite. Substitution can be verified by, for example, X-ray fluorescence, high frequency plasma emission spectrometry, atomic absorption spectrometry, ultraviolet-visible-near-infrared spectrophotometry (UV-Vis-NIR), Fourier transform infrared spectroscopy (FT-IR), and/or nuclear magnetic resonance spectrometry (NMR).

In the descriptions herein, the titania component of the binder, and the one or more phosphorus components, are distinct and separate from the metals that replace the aluminum atoms in the USY zeolite framework.

In embodiments herein, the post-framework modified USY zeolite is provided at step 13, which can be formed as described herein or provided from another source. The post-framework modified USY zeolite generally incorporates one or more of zirconium, titanium, and/or hafnium into its framework, in effective concentrations of about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, $ZrO_2$, $TiO_2$ and/or $HfO_2$) and as measured relative to the mass of the post-framework modified USY zeolite; in certain embodiments, the amounts of individual materials supplying Zr, Ti, and/or Hf can be less than 0.1, 0.2 or 0.3 W %, but when combined, the total is at least 0.1, 0.2 or 0.3 W %. In certain embodiments the framework substituted USY zeolite component is provided in a "wet" state, whereby the solid material from the framework substitution step, step 12, is filtered/washed and provided in a wet state, whereby the drying step typically utilized is not carried out (carried out to a lesser degree) so that water remains entrained in the solids. In certain embodiments the framework substituted USY zeolite component is provided in a "dry" state, whereby the solid material from the framework substitution step, step 12, is filtered, and dried, but provided in an uncalcined state, whereby the thermal treatment step to calcine the material that is typically utilized is not carried out. In certain embodiments the framework substituted USY zeolite component is provided in a "dry" state, whereby the solid material from the framework substitution step, step 12, is filtered, dried, and calcined. Accordingly, the USYA at step 13 is provided as wet, dry (uncalcined) or calcined zeolite material.

Step 14 represents provision and/or formation of a titania-containing binder component, which is subsequently combining with the post-framework modified USY zeolite and extruded, steps 16 and 17. The binder component comprises titania and one or more other inorganic oxides. In embodiments herein, the binder component includes titania and or one more other inorganic oxides, formed as an amorphous composite. In certain embodiments, the binder component comprises an amorphous binary composite, alumina-titania. In certain embodiments, the binder component comprises an amorphous ternary composite, alumina-silica-titania. Any of these embodiments can be combined with one or more other components, including one or more of phosphorus, boria or zirconia. In certain embodiments the binder component is inorganic oxide selected from the group consisting of alumina-titania, silica-alumina-titania, alumina-zirconia-titania, alumina-boria-titania, phosphorus-alumina-titania, silica-alumina-boria-titania, phosphorus-alumina-boria-titania, phosphorus-alumina-silica-titania, silica-alumina-zirconia-titania, alumina-zirconia-titania, and phosphorus-alumina-zirconia-titania. In certain embodiments the binder component is inorganic oxide selected from the group consisting of alumina, titania and silica.

The titania-containing binder component comprises about 0.01-15, 0.1-15, 1-15, 2-15, 5-15, 0.01-10, 0.1-10, 1-10, 2-10, 5-10, 0.01-8, 0.1-8, 1-8 or 2-8 W % titania relative to the total mass of the binder component. In certain embodiments, titania-containing binder component comprises about 0.01-15, 0.1-15, 1-15, 2-15, 5-15, 0.01-10, 0.1-10, 1-10, 2-10, 5-10, 0.01-8, 0.1-8, 1-8 or 2-8 W % titania, about 0.01-10, 0.1-10, 1-10, 2-10, 5-10, 0.01-8, 0.1-8, 1-8 or 2-8 W % silica, and about 80-99.98, 80-99.8, 80-98, 80-96, 80-90, 84-99.98, 84-99.8, 84-98, 84-96 or 84-90 W % alumina. In certain embodiments, titania-containing binder component comprises about 5-10 W % titania, about 5-10 W % silica, and about 80-90 W % alumina.

A suitable binder can be formed from a gel of titania and other inorganic oxides such as alumina and/or silica. Suitable precursors to form titania in the binder include but are not limited to one or more of $Ti(OH)_4$, $TiO(OH)_2$, $TiO_2$, $Ti(C_2O_4)_2$, $TiSO_4$ or $Ti(SO_4)_2$. Suitable precursors to form alumina in the binder include but are not limited to one or more of $NaAlO_2$ and $Al_2(SO_4)_3$. In certain embodiments precursors to form alumina include those selected from the group consisting of aluminates, alumina, aluminum colloids, boehmites, pseudo-boehmites, aluminum hydroxides, aluminum salts, aluminum alkoxides, and alumina gels. Suitable precursors to form silica in the binder include but are not limited to one or more of $Na_2SiO_3$ and $Na_4SiO_4$. In certain embodiments precursors to form silica include those selected from the group consisting of sodium silicate (water glass), fumed silica, precipitated silica, colloidal silica, silica gels, silicon hydroxides and silicon alkoxides. Each of the precursors are provided in an effective concentration, for example in an aqueous concentration of about 1-15, 1-10 or 1-5 W %. In certain embodiments, the precursors are mixed for a suitable time and at a suitable temperature, for example for about 15-180, 15-120, 15-90, 15-75, 30-180, 30-120, 30-90 or 30-75 minutes, at about 30-90, 30-75, 30-70, 40-90, 90-75 or 40-70° C.; products are washed to remove, for example, sodium sulfate; ion exchanged to adjust alumina content, and pH adjusted, for example to about 10 with an ammonium source; and dehydrated and kneaded.

In certain embodiments, an intimate mixture of solid titania and one or more other solid inorganic oxides can be used directly as the binder component. For example, a mixture of solid titania particles and one or more other inorganic oxides in solid form can be formed into a slurry or paste and intimately mixed to form a homogeneous mixture that is used as the binder. For example, titania, and one or both of alumina and silica, optionally including one or more of phosphorus, boria and zirconia, are mixed at effective ratios as noted above, and at a suitable temperature, for example, in the range of about 15-80, 15-60, 15-35, 15-30 or 20-60° C. The mixture is kneaded/mulled with an effective amount of water, for instance, at a liquid/solid mass ratio range of about 30-80, for an effective kneading/mulling time, for instance in a range of about 10-180 minutes, or until an effective amount of water content is removed. Therefore, the kneading/mulling of the wet solid materials forms a dough that is mixed with the post-framework modified USY zeolite as described herein.

The post-framework modified USY zeolite and the titania-containing binder component are combined to form the catalyst support material. The post-framework modified USY zeolite in a wet, dry (uncalcined) or calcined state, is combined with the titania-containing binder component, in a wet, dry (uncalcined) or calcined state. In certain embodiments the combining and forming can follow known processes for forming catalysts, for example, by mixing and kneading the components (step 16), then forming them into the desired shapes by coextruding or otherwise forming composite support particles (step 18), and calcining the composite support particles (step 19).

The composite support material is formed of the post-framework modified USY zeolite material, for example from step 13 herein and the titania-containing binder component (for example from step 14 herein), and optionally one or more other zeolitic materials. The composite support material generally has a surface area in the range of about 150-500, 150-450, 200-500, 200-450 or 300-450 m²/g, and a pore volume in the range of about 0.4-0.8, 0.4-0.75, 0.4-0.65, 0.45-0.8, 0.45-0.75 or 0.45-0.65 ml/g. The content of the post-framework modified USY zeolite component, the titania-containing binder component and the active components are appropriately determined according to the object. For example, the post-framework modified USY zeolite content of the catalyst particles formed with the composite support material can be in the range of about 0.1-99, 0.1-90, 0.1-80, 0.1-70, 0.1-50, 0.1-40, 2-99, 2-90, 2-80, 2-70, 2-50, 2-40, 20-99, 20-90, 20-80, 20-50 or 20-40 W %, with the remaining content being the titania-containing binder component and the active components, and in certain embodiments optionally one or more other zeolitic materials.

In the mixing/kneading step 16, post-framework modified USY zeolite and the titania-containing binder component are mixed at effective ratios as noted above, and at a suitable temperature, for example, in the range of about 15-80, 15-60, 15-35, 15-30 or 20-60° C. The mixture is kneaded/mulled with an effective amount of water, for instance, at a liquid/solid mass ratio range of about 30-80, for an effective kneading/mulling time, for instance in a range of about 10-180 minutes. Therefore, the kneading/mulling of the wet solid materials forms a dough that is subsequently formed and dried. The kneaded/mulled product can be subjected to thermal treatment in order to obtain a more intimate contact between components and better homogeneity by thermal diffusion and solid-state reactions. The kneaded/mulled material thus obtained is extruded, forming step 18, through a die with an effective cross-sectional shape and dimension, and at a suitable temperature, for example, in the range of about 15-80, 15-60, 15-35, 15-30 or 20-60° C. Effective cross-sectional shapes include, for instance, cylindrical, trilobe, twisted trilobe, or quadrilobe. Effective cross-sectional dimensions include, for instance, a diameter or effective diameter in the range of about 0.8-3 or 0.8-2.5 millimeters. The resulting extrudates are dried at an effective temperature, for example in a range of about 80-180 or 100-180° C., for an effective residence time, for instance in a range of about 30-1800, 60-1800, 30-600 or 60-600 minutes, to recover dried composite extrudates. Optionally, the separate drying step can be avoided, whereby the composite extrudates are passed to a thermal treatment step 19 for calcination. In the thermal treatment step 19, the composite extrudates (optionally dried) are subjected to thermal treatment to prepare calcined composite particles. In certain embodiments the thermal treatment at step 19 comprises calcining the composite extrudates (optionally dried) at effective temperatures (typically in the presence of air or oxygen, or in the presence of steam), for example in a range of about 400-800, 400-700, 400-650, 500-800, 500-700, 500-650, 550-800, 550-700, 550-650, 600-800 or 600-700° C., and for a time range of about 10-600, 10-180, 30-600 or 30-180 minutes, to recover calcined composite particles.

Active components, including a phosphorous component and one or more other hydrocracking metals and/or promoters, are included in the catalyst particles. In certain embodiments the post-framework modified USY zeolite material in the final particles services as an active catalytic material in addition to the impregnated active components of the catalyst particle.

The titania-containing binder component, the post-framework modified USY zeolite, and the calcined composite particles are characterized by outer surfaces and inner pore wall surfaces, and the active components are loaded on one or more of these surfaces. Resulting particles/extrudates include: the titania-containing binder component and active components including a phosphorus component and one or more other hydrocracking metals and/or promoters that are (a) loaded on the outer surfaces and inner pore wall surfaces of the calcined composite particles; (b) loaded on the outer surfaces and inner pore wall surfaces of the kneaded/mulled composite of the titania-containing binder component and the post-framework modified USY zeolite; and/or (c) loaded on the outer surfaces and inner pore wall surfaces of the titania-containing binder component.

In certain embodiments all or a portion of the active components (in terms of quantity, type of active component or both quantity and type of active component) are loaded in/on: the calcined composite particles (denoted as step 20), the titania-containing binder component (denoted as step 15), and/or the kneaded/mulled composite of the titania-containing binder component and the post-framework modified USY zeolite (denoted as step 17). Steps 20, 15 and 17 are shown in FIG. 1 in dashed lines, but it is to be appreciated that one or more of these steps is necessary to produce the catalyst particles herein. In certain embodiments only step 20 is carried out. In certain embodiments only step 15 is carried out. In certain embodiments only step 17 is carried out. In certain embodiments only steps 15 and 20 are carried out. In certain embodiments only steps 17 and 20 are carried out. In certain embodiments only steps 15 and 17 are carried out. In certain embodiments each of steps 20, 15 and 17 are carried out.

The final product, calcined composite catalyst particles have loaded therein active components including a phosphorous component and one or more other hydrocracking metals and/or promoters.

The phosphorus component can be provided by incorporating it in the active component solution with one or more other active components. For example, phosphoric acid can be used in the active component solution in an effective concentration, for example in an aqueous concentration of about 1-10, 1-5 or 1-3 W %. Catalysts produced according to the embodiments herein can contain about 0.01-5.0, 0.1-5.0, 1-5.0, 0.01-3.0, 0.1-3.0 or 1.0-3.0 W % of the phosphorus component in terms of metal, oxide or sulfide relative to the total mass of the composite catalyst material.

In addition to the phosphorus component, the active components also include one or more metals or metal compounds (oxides or sulfides) known in the art of hydrocracking, including those selected from the Periodic Table of the Elements IUPAC Groups 6, 7, 8, 9 and 10. In certain embodiments active components include the phosphorus component and one or more additional components including those effective as hydrocracking catalysts such as one or more of Mo, W, Co or Ni (oxides or sulfides). In certain embodiments, the active components comprise the phosphorus component, a Mo and/or W metal or compound as a hydrocracking component, and a Co and/or Ni metal or compound is used as a promoter. In certain embodiments catalysts herein comprise Ni/Mo/P as active components. In certain embodiments catalysts herein comprise Co/Mo/P as active components. In certain embodiments catalysts herein comprise Ni/W/P as active components. In certain embodiments catalysts herein comprise Co/W/P as active components.

The active components may be contained in catalyst in effective concentrations. For example, total active component content (phosphorous and one or more hydrocracking metals and/or promoters) can be present in an amount of about 0.01-40, 0.1-40, 1-40, 2-40, 5-40, 0.01-30, 0.1-30, 1-30, 2-30, 5-30, 0.01-20, 0.1-20, 1-20, 2-20 or 5-20 W % in terms of metal, oxide or sulfide.

In certain embodiments, denoted "embodiment 1a" herein, active components are loaded in the calcined composite support particles (step 20). The so-formed catalyst particles are then calcined again (step 21) and the final product, the catalyst particles having active components on a composite support, is recovered.

At the active components loading step 20, the active components are loaded onto the surfaces, including the pore wall surfaces, of the support. Several methods can be used to add the active component(s) to the support, including but not limited to immersion, incipient wetness, and evaporative. In certain embodiments a calcined support is immersed in an excess of an aqueous solution containing active components. The solution fills the pores and is also adsorbed on the support surface, and excess solution is removed. In certain embodiments impregnation is carried out using incipient wetness by tumbling or spraying the support with a volume of solution having a concentration of metal compound tailored to achieve the targeted metal level. In certain embodiments evaporative impregnation is carried out whereby the support is saturated with water or with acid solution and immersed into the aqueous solution containing the active components; that compound subsequently diffuses into the pores of the support through the aqueous phase. The metal-loaded support is dried and calcined (step 21), forming oxides of the active components and aluminum orthophosphate.

In certain embodiments, the active components loading step 20 comprises immersing the calcined composite support particles, formed of the post-framework modified USY zeolite and a binder, in an aqueous solution containing active components. The quantity and concentration of the aqueous solution containing active components is dependent on the desired quantity of the active components to be loaded on the composite support particles. In certain embodiments of the above methods, the volume of the active component solution is equal to or slightly less than the pore volume of the support. The solution is maintained at an effective temperature, for instance about 40-100, 40-99, 60-100, 60-99, 60-97, 70-99, 70-97, 80-99, 80-97 or 90-99° C. and for an effective residence time, for instance in a range of about 40-1200, 40-600, 40-360, 60-1200, 60-600, 60-360, 120-1200, 120-600, 120-360, 180-1200, 180-600, 180-360, or 240-360 minutes. The resulting solids can be filtered and dried at an effective temperature, for example in a range of about 80-180 or 100-180° C., for an effective residence time, for instance in a range of about 30-1800, 60-1800, 30-600 or 60-600 minutes, to recover composite support particles, formed of the post-framework modified USY zeolite and a binder, having the active components loaded on the composite material. Optionally, the separate drying step can be avoided, whereby the composite material with active components is passed to a thermal treatment step 21 for calcination.

In the thermal treatment step 21, the loaded composite material is subjected to thermal treatment to prepare calcined composite particles with active components on the composite material. In certain embodiments the thermal treatment at step 21 comprises calcining at effective temperatures, for example in a range of about 400-800, 500-800, 500-700, 500-650, 550-800, 550-700, 550-650, 600-800 or 600-700° C., and for a time range of about 10-600, 10-180, 30-600 or 30-180 minutes, to recover the calcined composite particles with active components on the composite material.

In certain embodiments, calcining occurs in the presence of air. At step 22, the final catalyst product is recovered. In embodiments in which the catalyst is a hydrocracking catalyst, a hydrogenation catalyst or a reforming catalyst, the composite support material having active components loaded therein generally has a surface area in the range of about 150-500, 150-450, 200-500, 200-450 or 300-450 m$^2$/g, and a pore volume in the range of about 0.4-1.0, 0.4-0.8, 0.4-0.75, 0.4-0.65, 0.45-1.0, 0.45-0.8, 0.45-0.75 or 0.45-0.65 ml/g.

In certain embodiments, denoted "embodiment 1b" herein, active components are loaded in the titania-containing binder component (step 15). The so-formed titania-containing binder component is then passed to the subsequent step 16 for combination with the post-framework modified USY zeolite material.

The active components loading step 15 includes loading active components onto the surfaces, including the pore wall surfaces, of the titania-containing binder component. Several methods can be used to add the active component(s) to the titania-containing binder component, including but not limited to co-mulling, immersion, incipient wetness, and evaporative.

Step 15 is shown as a discrete step, although loading of active components in the titanium-containing binder component can occur during the mixing and kneading/mulling of the titanium-containing binder component (for instance in processes described with respect to step 14), or as a separate step thereafter. In certain implementations of embodiment 1b, during the mixing and kneading/mulling of binder components, all or a portion of water that would typically be used is substituted with an aqueous solution with one or more of the active components.

In certain embodiments of step 15, an effective quantity of the titania-containing binder component is co-mulled with a solution containing active components. In certain embodiments of step 15, an effective quantity of the components of the titania-containing binder (including titania, and: alumina, silica, or alumina and silica; alone or in combination with one or more of phosphorus, boria or zirconia) are co-mulled with a solution containing active components.

In certain embodiments of step 15, an effective quantity of titania-containing binder, for instance in a kneaded state, is immersed in an excess of solution containing active component(s). The solution fills the pores and is also adsorbed on the outer surface, and excess solution is removed to recover the loaded binder component. In certain embodiments, the volume of the active component solution is equal to or slightly less than the pore volume of the binder.

In certain embodiments, step 15 is carried out using incipient wetness by tumbling or spraying an effective quantity of titania-containing binder with a volume of solution having a concentration of active components tailored to achieve the targeted metal level. In certain embodiments the volume of the solution is equal to or slightly less than the pore volume of the binder. The loaded binder material is recovered.

In certain embodiments, step 15 is carried out by evaporative impregnation in which an effective quantity of titania-containing binder is saturated with water or with an acid solution and immersed into the aqueous solution containing the active components. The active component compounds subsequently diffuse into the pores of the binder through the aqueous phase. The loaded binder material is recovered.

In certain embodiments of the above methods, the volume of the active component solution is equal to or slightly less than the pore volume of the binder material. The solution is maintained at an effective temperature, for instance about 40-100, 40-99, 60-100, 60-99, 60-97, 70-99, 70-97, 80-99, 80-97 or 90-99° C. and for an effective residence time, for instance in a range of about 40-1200, 40-600, 40-360, 60-1200, 60-600, 60-360, 120-1200, 120-600, 120-360, 180-1200, 180-600, 180-360, or 240-360 minutes.

In certain embodiments of step 15, loading can be attained by loading the active component solution of an appropriate concentration up to the available pore volume of the binder. In further embodiments of step 15, a lesser amount is used to control the active component loading. For example, an effective volume of the loading metal solution can be, for instance, in the range of about 1-100, 1-99, 1-90, 20-100, 20-99, or 20-90 V % relative to the total pore volume of the binder.

In further embodiments of step 15, wet binder material is used. The wet binder material contains water within all or a portion of the pore volume, for instance, in the range of about 1-100, 1-99, 1-90, 50-100, 50-99, or 50-90 V % relative to the total pore volume. This volume can be controlled by partial drying of the of the material to alter the degree of wetness. The active component solution, whether provided by immersion, incipient wetness, or evaporative impregnation, is completely or partially blocked from the saturated pores, and as such there is less diffusion of metals into pores. Therefore, the active component can be principally positioned at the external surface of the binder component material with a limited amount in the pores.

In certain embodiments, denoted "embodiment 1c" herein, active components are loaded in the composite of the titania-containing binder component and the post-framework modified USY zeolite material (step 17). The so-formed composite is then passed to the subsequent step 18 for forming.

The active components loading step 17 includes loading of active components onto the surfaces, including the pore wall surfaces, of the composite of the titania-containing binder component and the post-framework modified USY zeolite material; several methods can be used to add the active component(s) to said composite including but not limited to co-mulling, immersion, incipient wetness, and evaporative.

Step 17 is shown as a discrete step, although loading of active components in the composite of the titania-containing binder component and the post-framework modified USY zeolite material can occur during the mixing and kneading/mulling of the components (for instance in processes described with respect to step 16), or as a separate step thereafter. In certain implementations of embodiment 1c, during the mixing and kneading/mulling of composite support components, all or a portion of water that would typically be used is substituted with an aqueous solution with one or more of the active components.

In certain embodiments of step 17, an effective quantity of the composite of the titania-containing binder component and the post-framework modified USY zeolite material is co-mulled with a solution containing active components.

In certain embodiments of step 17, an effective quantity of the composite of the titania-containing binder component and the post-framework modified USY zeolite material, for instance in a kneaded state, is immersed in an excess of solution containing active component(s). The solution fills the pores and is also adsorbed on the outer surfaces, and excess solution is removed to recover the loaded composite. In certain embodiments, the volume of the active component solution is equal to or slightly less than the pore volume of the composite.

In certain embodiments, step 17 is carried out using incipient wetness by tumbling or spraying an effective quantity of composite with a volume of solution having a concentration of active components tailored to achieve the targeted metal level. In certain embodiments the volume of the solution is equal to or slightly less than the pore volume of the composite. The loaded composite material is recovered.

In certain embodiments, step 17 is carried out by evaporative impregnation in which an effective quantity of titania-containing composite is saturated with water or with an acid solution and immersed into the aqueous solution containing the active components. The active component compounds subsequently diffuse into the pores of the composite through the aqueous phase. The loaded composite material is recovered.

In certain embodiments of the above methods, the volume of the active component solution is equal to or slightly less than the pore volume of the composite material. The solution is maintained at an effective temperature, for instance about 40-100, 40-99, 60-100, 60-99, 60-97, 70-99, 70-97, 80-99, 80-97 or 90-99° C. and for an effective residence time, for instance in a range of about 40-1200, 40-600, 40-360, 60-1200, 60-600, 60-360, 120-1200, 120-600, 120-360, 180-1200, 180-600, 180-360, or 240-360 minutes.

In certain embodiments of step 17, loading can be attained by loading the active component solution of an appropriate concentration up to the available pore volume of the composite. In further embodiments of step 17, a lesser amount is used to control the active component loading. For example, an effective volume of the loading metal solution can be, for instance, in the range of about 1-100, 1-99, 1-90, 20-100, 20-99, or 20-90 V % relative to the total pore volume of the composite.

In further embodiments of step 17, wet composite material is used. The wet composite material contains water within all or a portion of the pore volume, for instance, in the range of about 1-100, 1-99, 1-90, 50-100, 50-99, or 50-90 V % relative to the total pore volume. This volume can be controlled by partial drying of the of the material to alter the degree of wetness. The active component solution, whether provided by immersion, incipient wetness, or evaporative impregnation, is completely or partially blocked from the saturated pores, and as such there is less diffusion of metals into pores. Therefore, the active component can be principally positioned at the external surface of the composite material with a limited amount in the pores.

In certain embodiments, one or more of embodiments 1a, 1b and/or 1c are carried out, referred to colloquially as "hybrid" loading. In certain embodiments of a hybrid loading method all or a portion of one or more active components are loaded at step 15, and all or a portion of one or more active components that differ from the active component(s) loaded at step 15 are loaded at step 17 and/or step 20. In certain embodiments of a hybrid loading method all of one or more active components are loaded at step 15, and all of one or more active components that differ from the active component(s) that are loaded at step 15 are loaded at step 17 and/or step 20. In certain embodiments of a hybrid loading method a first quantity of one or more active components are loaded at step 15, and one or more other quantities of one or more active components are loaded at step 17 and/or step 20, wherein the one or more active components loaded at the different steps can be the same or different type of active component. In certain embodiments of a hybrid loading method all or a portion of one or more active components are loaded at step 15 and/or step 17, and all or a portion of one or more active components that differ from the active component(s) loaded at step 15 and/or step 17 are loaded at step 20. In certain embodiments of a hybrid loading method all of one or more active components are loaded at step 15 and/or step 17, and all of one or more active components that differ from the active component(s) that are loaded at step 15 and/or step 17 are loaded at step 20. In certain embodiments of a hybrid loading method a first quantity of one or more active components are loaded at step 15 and/or step 17, and one or more other quantities of one or more active components are loaded at step 20, wherein the one or more active components loaded at the different steps can be the same or different type of active component. Process including hybrid loading are disclosed in commonly owned U.S. patent application Ser. Nos. 17/577,691, 17/577,747 and 17/577,794 filed on Jan. 18, 2022 and entitled "Catalysts with Modified Active Phase Dispersion and Method to Prepare Catalysts with Modified Active Phase Dispersion," all of which are incorporated by reference herein in their entireties.

In any of the above-described embodiments, one or more additional zeolitic components (that is, a zeolite material other than the post-framework modified USY zeolite or metal-loaded post-framework modified USY zeolite) can be integrated, for instance at step in which the post-framework modified USY zeolite or the metal-loaded post-framework modified USY zeolite is mixed with inorganic oxide. Said additional zeolitic material can include but is not limited to mordenite, ZSM-5, ZSM-11, ZSM-12, ZSM-22, ZSM-23, ZSM 35, beta-type, Y and USY (wherein this USY zeolitic component is not the same as the post-framework modified USY zeolite described herein). For example, these can be (FAU) framework, which includes USY, having a micropore size related to the 12-member ring when viewed along the [111] direction of 7.4×7.4 Å; (MFI) framework, which includes ZSM-5, having a micropore size related to the 10-member rings when viewed along the [100] and [010] directions of 5.5×5.1 Å and 5.6×5.3 Å, respectively; (MEL) framework, which includes ZSM-11, having a micropore size related to the 10-member ring when viewed along the [100] direction of 5.4×5.3 Å; (MTW) framework, which includes ZSM-12, having a micropore size related to the 12-member ring when viewed along the [010] direction of 5.6×6.0 Å; (TON) framework, which includes ZSM-12, having a micropore size related to the 10-member ring when viewed along the [001] direction of 4.6×5.7 Å; (MTT) framework, which includes ZSM-23, having a micropore size related to the 10-member ring when viewed along the [001] direction of 4.5×5.2 Å; (FER) framework, which includes ZSM-35, having a micropore size related to the 10-member ring and 8-member ring when viewed along the [001] and [010] directions of 4.2×5.4 Å and 3.5×4.8 Å, respectively; (MOR) framework, which includes mordenite zeolites, having a micropore size related to the 12-member ring and 8-member ring when viewed along the [001] and [001] directions of 6.5×7.0 Å and 2.6×5.7 Å, respectively; and (*BEA) framework, which includes zeolite beta polymorph A, having a micropore size related to the 12-member rings when viewed along the [100] and [001] directions of 6.6×6.7 Å and 5.6×5.6 Å, respectively.

A method for hydrocracking hydrocarbon oil is provided herein, including hydrocracking hydrocarbon oil with the hydrocracking catalyst described above. In certain embodiments, a method for hydrocracking hydrocarbon oil comprises introducing a hydrocarbon oil, for instance having a boiling point in the range of about 370-833, 370-816, 370-650, 375-833, 375-816 or 375-650° C., in the presence of hydrogen, to a hydrocracking zone including one or more reactors operating at a reactor temperature in the range of about 300-500, 330-450° C., a hydrogen partial pressure in the range of about 40-300, 40-150, 70-300 or 70-150 bar, a liquid hourly space velocity ("LHSV", which refers to the volumetric rate of the liquid feed divided by the volume of the catalyst) in the range of about 0.1-10, 0.2-1.5 h$^{-1}$, and a hydrogen/oil ratio of in the range of about 500-2500, 1000-2000 normalized cubic meters of hydrogen per cubic meter of oil (Nm$^3$/m$^3$). "Hydrocracking zone" means one or more reactors and associated effluent separation apparatus, and can contain two or more reactors.

In certain embodiments, a method for hydrocracking hydrocarbon oil comprises filling a reactor vessel of a hydrocracking apparatus which is a flow reactor with the hydrocracking catalyst, and treating a hydrocarbon oil, for instance having a boiling point in the range of about 370-816, 370-650° C., in the presence of hydrogen, at a reactor temperature in the range of about 300-500, 330-450° C., a hydrogen partial pressure in the range of about 4-30, 7-15 MPa, a liquid hourly space velocity ("LHSV", which refers to the volumetric rate of the liquid feed divided by the volume of the catalyst) in the range of about 0.1-10, 0.2-1.5 h$^{-1}$, and a hydrogen/oil ratio of in the range of about 500-2500, 1000-2000 normalized cubic meters of hydrogen per cubic meter of oil (Nm$^3$/m$^3$).

In certain embodiments, a method for hydrocracking hydrocarbon oil comprises filling a reactor vessel of a hydrocracking apparatus which is a flow reactor with the hydrocracking catalyst, and treating a hydrocarbon oil having a boiling point in the range of about 370-650° C. in the presence of hydrogen at a reactor temperature in the range of about 330-450° C., a hydrogen partial pressure in the range of about 7-15 MPa, a LHSV in the range of about 0.2-1.5 h$^{-1}$, and a hydrogen/oil ratio of in the range of about 1000-2000 Nm$^3$/m$^3$ to afford middle distillates, kerosene and gas oil. In certain embodiments "middle distillates" refers to hydrocarbons having nominal boiling points in the range of about 135-370, 140-370, 145-370, 135-365, 140-365, 145-365, 135-360, 140-360 or 145-360° C. In certain embodiments "kerosene" refers to hydrocarbons having nominal boiling points in the range of about 135-270, 140-270, 145-270, 135-265, 140-265, 145-265, 135-260, 140-260 or 145-260° C. In certain embodiments "gas oil" refers to atmospheric gas oil including hydrocarbons having nominal boiling points in the range of about 250-370, 255-370, 260-370, 250-365, 255-365, 260-365, 250-360, 255-360 or 260-360° C.

In certain embodiments, a flow reactor used in a method for hydrotreating hydrocarbon oil described above can be a flow reactor selected from a stirring bath type reactor, a boiling bed type reactor, a baffle-equipped slurry bath type reactor, a fixed bed type reactor, a rotary tube type reactor and a slurry bed type reactor.

In certain embodiments, the hydrocarbon oil hydrotreated in the method described above contains heavy hydrocarbon oil obtained from (1) crude oil, (2) synthetic crude oil, (3) bitumen, (4) oil sand, (5) shale oil, (6) coal liquid, (7) plastic pyrolysis oil and/or (8) bio-mass derived oils.

In certain embodiments, the hydrocarbon oil in the method described above comprises, consists of, or consists essentially of heavy hydrocarbon oil obtained from (1) crude oil, (2) synthetic crude oil, (3) bitumen, (4) oil sand, (5) shale oil, (6) coal liquid, (7) plastic pyrolysis oil and/or (8) or bio-mass derived oils.

In certain embodiments, the hydrocarbon oil in the method described above comprises heavy hydrocarbon oil obtained from crude oil, synthetic crude oil, bitumen, oil sand, shale oil or coal liquid, wherein heavy hydrocarbon oil comprises, consists of, or consists essentially one or more of a) atmospheric gas oil (AGO), b) vacuum gas oil (VGO), c) deasphalted oil (DAO) obtained from a solvent deasphalting process or demetallized oil, d) light coker gas oil or heavy coker gas oil obtained from a coker process, e) cycle oil obtained from a fluid catalytic cracking (FCC) process, f) gas oil obtained from a visbreaking process; g) gas oil obtained from plastic pyrolysis oils; or h) bio-mass derived gas oils; wherein any of the feeds c) through h) include nominal boiling point ranges coinciding with that of atmospheric gas oil or vacuum gas oil.

EXAMPLES

Reference Ti—Zr—USY

The reference example provides a method of producing post-framework modified USY zeolite described herein, with titanium and zirconium replacing aluminum atoms in the USY zeolite framework (Ti—Zr—USY). The process corresponds to that disclosed in the '036 patent family (Examples 1 and 5).

First, 50.0 kg of a Na—Y zeolite having a SiO2/Al2O3 molar ratio of 5.2, a unit cell dimension of 2.466 nm, a specific surface area of 720 m2/g, and a Na2O content of 13.0 W %, was suspended in water (liquid/solid mass ratio of 12.5 L of water per kg of zeolite) at a temperature of 60° C. Then, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 L of water having a temperature of 60° C., washed with 500 L of water having a temperature of 60° C., dried at 130° C. for 20 hours, thereby affording about 45 kg of a Y zeolite ($NH_4^{65}Y$) in which 65% of sodium (Na) contained in Na—Y was ion-exchanged with ammonium ion ($NH_4^+$). The content of $Na_2O$ in $NH_4^{65}Y$ was 4.5 W %. Next, 40 kg of $NH_4^{65}Y$ was fired in a saturated water vapor atmosphere at 670° C. for 1 hour to form a hydrogen-Y zeolite (HY).

40 kg of HY was suspended in 400 L of water having a temperature of 60° C. Then, 49.0 kg of ammonium sulfate was added thereto. The resulting mixture was stirred at 90° C. for 1 hour and washed with 200 L of water having a temperature of 60° C. The mixture was then dried at 130° C. for 20 hours, thereby affording about 37 kg of a Y zeolite ($NH_4^{95}Y$) in which 95% of Na contained in the initial Na—Y was ion-exchanged with $NH_4$. About 33 kg of the synthesized $NH_4^{95}Y$ was fired in a saturated water vapor atmosphere at 650° C., for 1 hour, thereby affording about 15 kg of an ultra-stable Y zeolite (hereinafter, also referred to as "USY(a)") having a $SiO_2/Al_2O_3$ molar ratio of 5.2, a $Na_2O$ content of 0.6 W %, a crystal lattice constant of 2.438 nm, specific surface area of 635 m$^2$/g and a crystallinity of 98%.

Next, 26 kg of this USY(a)) was suspended in 260 L of water having a temperature of 60° C. After 61.0 kg of 25% sulfuric acid by mass was gradually added to the suspension, the suspension was stirred at 70° C. for one hour to dissolve extraskeletal aluminum. The suspension was filtered. The resulting solid was washed with 260 liter of deionized water having a temperature of 60° C. and dried at 130° C. for 20 hours, thereby affording an ultra-stable Y-type zeolite (hereinafter, also referred to as "USY (b)") having a $SiO_2/Al_2O_3$ molar ratio of 30.2, a crystal lattice constant of 2.436 nm, specific surface area of 710 m$^2$/g and a crystallinity of 105%.

USY (b) was fired at 600° C. for 1 hour, thereby affording about 17 kg of ultra-stable Y-type zeolite (hereinafter, also referred to as "USY (c)") having a $SiO_2/Al_2O_3$ molar ratio of 30.1, a crystal lattice constant of 2.436 nm, specific surface area of 712 m$^2$/g and a crystallinity of 105%.

1 kg of the USY(c) is suspended in 10 L of water at 25° C. The pH of the suspension is adjusted to 1.6 by gradually adding 25 W % sulfuric acid. Then 86 g of a solution containing 18 W % zirconium sulfate and 60 g of a solution containing 33 W % titanium sulfate was added thereto. The resulting mixture was stirred for 4 hours at room temperature. Then the pH was adjusted to 7.2 with 15 W % aqueous ammonia. After the mixture was stirred for 1 hour at room temperature, the mixture was filtered. The resulting solid was washed with 10 L of water and dried at 130° C. for 20 hours, thereby affording about 1 kg of a titanium-zirconium-substituted zeolite (Ti—Zr—USY) having a $SiO_2/Al_2O_3$ molar ratio of 40, a crystal lattice constant of 2.432 nm, specific surface area of 720 m$^2$/g, a crystallinity of 95%, a $ZrO_2$ content of 0.97 W % (relative to the total mass of Ti—Zr—USY) and a $TiO_2$ content of 0.98 W % (relative to the total mass of Ti—Zr—USY).

Reference Hydrocracking Catalyst

Calcined extrudates formed of a composite of Ti—Zr—USY (with a SAR of 40) and alumina were used as a reference hydrocracking catalyst. A summary of the reference catalyst composition is shown in Table 1.

To prepare an alumina binder, 40 kg of an aqueous solution of 3.3 W % sodium aluminate on an $Al_2O_3$ basis was mixed with 27 kg of an aqueous solution of 2.5 W % aluminum sulfate on an $Al_2O_3$ basis. Further, the mixture was stirred at 60° C. for 1 hour, and then the product was washed with 150 L of a 0.3 W % ammonia aqueous solution to remove $Na_2SO_4$. Next, the product from which $Na_2SO_4$ was removed was diluted with deionized water to adjust an $Al_2O_3$ concentration to 10 W %, and the pH was adjusted to about 10 with 15 W % aqueous ammonia. The mixture was stirred at 95° C. for 10 hours, dehydrated, washed, and kneaded with a kneader, thereby providing an alumina mixture. The alumina knead product thus prepared was mixed with the Ti—Zr—USY zeolite at a dry mass ratio alumina to zeolite of 7:3. The mixture was formed into a columnar shape having a diameter of 1.8 mm, dried at 110° C. for 12 hours, and calcined at 550° C. for 3 hours, thereby preparing calcined composite particles.

The active component was next added to the calcined composite particles. An aqueous solution containing active components was prepared by adding 500 mL of deionized water to 200 g of molybdenum trioxide and 90 g of nickel carbonate; the suspension was stirred for 5 hours at 90° C., and then 125 g of 100 W % malic acid was added to obtain the impregnation solution. The impregnation solution was mixed with 1000 g of the calcined composite particles (the composite of Ti—Zr—USY zeolite and the alumina binder) to incorporate the active component with a pore filling method, and dried at 200° C. for 1 hour. The recovered mixture was calcined at 500° C. for 1 hour to prepare the calcined composite particles with active component, and recovered, thereby affording about 1200 g of the reference catalyst.

Hydrocracking Catalyst A and B

Calcined extrudates formed of a composite of Ti—Zr—USY (with a SAR of 40 and 80) and an alumina-silica-titania binder were prepared and loaded with phosphorus, catalysts A and B. A summary of the compositions is shown in Table 1. The reference catalyst and the catalysts A and B contain equivalent proportions of Ti—Zr—USY zeolite. Catalysts A and B contain equivalent concentrations of $P_2O_5$ (2.4 W %) and zeolite (30 W %), and differ from each other in the silica-to-alumina ratios of the Ti—Zr—USY zeolite (40 in catalyst A and 80 in catalyst B). The reference catalyst also differs from catalysts A and B in regards to the binder, where the reference catalyst contains alumina, and catalysts A and B is a ternary composite of alumina-silica-titania binder.

To prepare the silica-alumina-titania binder for both catalysts A and B, 38 kg of an aqueous solution of 3.0 W % sodium aluminate on an $Al_2O_3$ basis was mixed with 22 kg of an aqueous solution of 2.5 W % aluminum sulfate on an Al2O3 basis and with 3.2 kg of an aqueous solution of 5 W % titanium disulfate on a $TiO_2$ basis and with 0.67 kg of 24 W % water glass on a $SiO_2$ basis. The mixture was stirred at 60° C. for 1 hour, and then the product was washed with 150 L of a 0.3 W % ammonia aqueous solution to remove $Na_2SO_4$. Next, the product from which $Na_2SO_4$ was removed was diluted with deionized water to adjust an $Al_2O_3$ concentration to 10 W %, and the pH was adjusted to about 10 with 15 W % aqueous ammonia. The mixture was stirred at 95° C. for 10 hours, dehydrated, washed, and kneaded with a kneader, thereby providing an alumina mixture. The silica-alumina-titania kneaded product thus prepared was mixed with the Ti—Zr—USY zeolite at a dry mass ratio alumina to zeolite of 7:3. In the preparation of catalyst A, the SAR of the Ti—Zr—USY zeolite was 40; in the preparation of catalyst A, the SAR of the Ti—Zr—USY zeolite was 80. The mixture was formed into a columnar shape having a diameter of 1.8 mm, dried at 110° C. for 12 hours, and calcined at 550° C. for 3 hours, thereby preparing calcined composite particles.

The active component was next added to the calcined composite particles. An aqueous solution containing active components was prepared by adding 500 mL of deionized water to 200 g of molybdenum trioxide and 90 g of nickel carbonate; the suspension was stirred for 5 hours at 90° C., and then 77 g of 100 W % citric acid and 50 g of 62 W % phosphoric acid was added to obtain the impregnation solution. The impregnation solution was mixed with 1000 g of the calcined composite particles (the composite of Ti—Zr—USY zeolite, and the alumina-silica-titania binder) to incorporate the active component with a pore filling method, and dried at 200° C. for 1 hour. The recovered mixture was calcined at 500° C. for 1 hour to prepare the calcined composite particles with active components, and recovered, thereby affording about 1200 g of the reference catalyst.

Test Example: Catalyst Activity Evaluation

Figure 2:
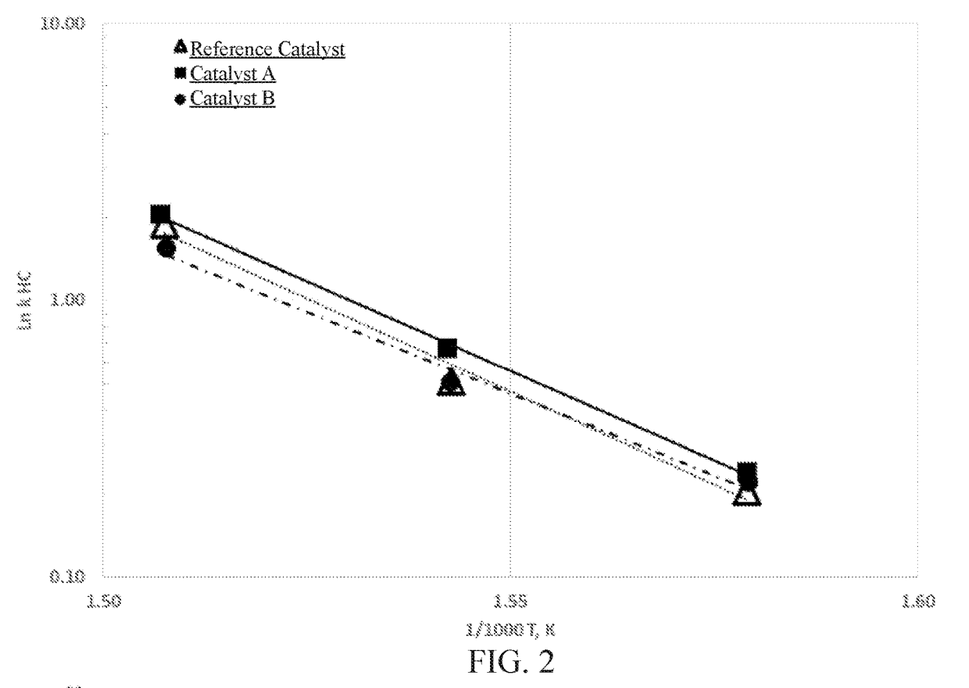
FIG. 2 shows Arrhenius curves for catalysts tested in the examples herein.
Figure 3:
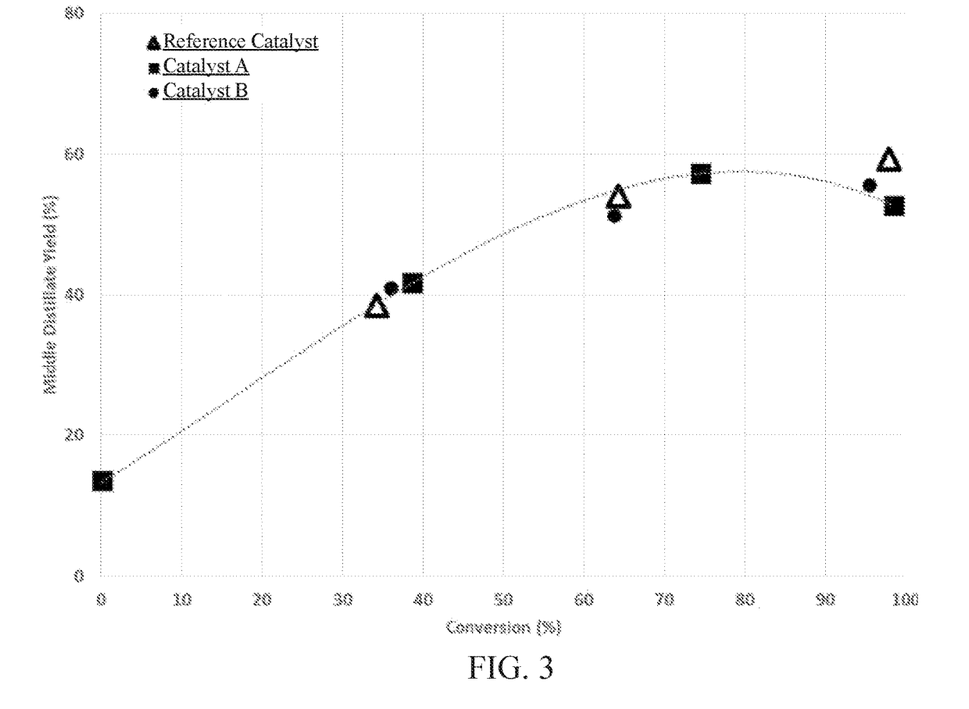
FIG. 3 shows product yields as a function of conversion for catalysts tested in the examples herein.

The catalysts were subjected to a hydrocracking test using straight run vacuum gas oil (SR VGO) from an Arabian crude oil; the properties and composition are shown in Table 2. Two-reactor pilot plant systems were used, each with a first reactor loaded with 100 ml of a commercial pretreat catalyst followed by a second reactor 100 ml of the hydrocracking catalyst (reference catalyst, catalyst A and catalyst b) was used. Tests were conducted at a hydrogen partial pressure of 13.5 MPa, a hydrogen/oil ratio of 1,000 StL/L of oil, LHSV of 0.50 $hr^{-1}$, and at varying reaction temperatures of 360° C., 375° C. and 390° C. The products were analyzed by simulated distillation (ASTM D2887) to determine the product yields for naphtha boiling in the range C5-145° C., kerosene boiling in the range 145-260° C. and diesel boiling in the range 260-360° C. FIG. 2 shows Arrhenius curves for three catalysts tested. As is apparent from the slope of the Arrhenius plots, all the catalysts have similar activation energies. Catalyst A, which contains phosphorus and titania is the most active catalyst among all the catalysts tested. FIG. 3 shows the product yields as a function of conversion. All catalysts tested exhibit similar yields at low conversion levels, for instance about 5-60 W %. At full conversions the reference catalyst resulted in a higher middle distillate yield.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "of" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| Catalyst | Binder Type | Zeolite Content | Zeolite SAR Mol/Mol | $MoO_3$ W % | NiO W % | $P_2O_5$ W % |
|---|---|---|---|---|---|---|
| Reference | $Al_2O_3$ | 30 | 40 | 16 | 4 | 0 |
| A | $Al_2O_3/SiO_2/TiO_2$ | 30 | 40 | 16 | 4 | 2.4 |
| B | 84/8/8 | 30 | 80 | 16 | 4 | 2.4 |

TABLE 2

| Property | Value |
|---|---|
| Density | 0.921 g/cc |
| Sulfur | 2.47 W % |
| Nitrogen | 960 ppmw |
| Distillation | |
| IBP | 216° C. |
| 5 W % | 315° C. |
| 10 W % | 344° C. |
| 30 W % | 402° C. |
| 50 W % | 440° C. |
| 70 W % | 482° C. |
| 90 W % | 540° C. |
| 95 W % | 565° C. |
| FBP | — |

The invention claimed is:

1. A hydrocracking catalyst for hydrocarbon oil comprising:
   a support comprising a post-framework modified ultra-stable Y-type (USY) zeolite component comprising one or more of titanium, zirconium and/or hafnium substituting aluminum atoms constituting a zeolite framework of the USY zeolite, and a binder component, the binder component comprising about 5-10 W % titania relative to the total mass of the binder component and one or more additional inorganic oxides; and
   active components including a phosphorous active component and one or more hydrocracking metal active components loaded on said support.

2. The hydrocracking catalyst as in claim 1, wherein the binder component comprises an amorphous binary composite of alumina-titania or an amorphous ternary composite of alumina-silica-titania.

3. The hydrocracking catalyst as in claim 1, wherein the binder component further comprises about 5-10 W % silica, and about 80-90 W % alumina, each relative to the total mass of the binder component.

4. The hydrocracking catalyst as in claim 1, comprising about 0.01-5.0 W % of the phosphorous active component relative to the total mass of the hydrocracking catalyst.

5. The hydrocracking catalyst as in claim 4, comprising about 1.0-3.0 W % of the phosphorus active component relative to the total mass of the hydrocracking catalyst.

6. The hydrocracking catalyst as in claim 1, comprising, as one or more hydrocracking metal active components, one or more metals or metal compounds (oxides or sulfides) selected from the Periodic Table of the Elements IUPAC Groups 6, 7, 8, 9 and 10.

7. The hydrocracking catalyst as in claim 1, comprising, as one or more hydrocracking metal active components, one or more metals or metal compounds (oxides or sulfides) of Mo, W, Co or Ni.

8. The hydrocracking catalyst as in claim 1 having a specific surface area of 200 to 450 $m^2/g$; a volume of pores having a diameter of 600 Å or less of 0.40 to 0.75 ml/g; and wherein the amount of the phosphorus component comprises 0.01-5.0 W % relative to the mass of the catalyst material.

9. The hydrocracking catalyst as in claim 1 in the form of extrudates, wherein said extrudates are calcined.

10. The hydrocracking catalyst as in claim 1, wherein the post-framework modified USY zeolite comprises titanium and zirconium substituting aluminum atoms constituting a zeolite framework of the USY zeolite.

11. The hydrocracking catalyst as in claim 10, wherein the post-framework modified USY zeolite is substituted with 0.1-5 W % zirconium atoms and 0.1-5 W % titanium ions calculated on an oxide basis.

12. The hydrocracking catalyst as in claim 1, wherein the post framework-substituted USY zeolite has the following characteristics: (a) a crystal lattice constant of 2.430 to 2.450 nm, (b) a specific surface area of 600 to 900 $m^2/g$, and (c) a molar ratio of $SiO_2$ to $Al_2O_3$ of 10 to 100.

13. A method for hydrocracking hydrocarbon oil, comprising: hydrocracking hydrocarbon oil with the hydrocracking catalyst according to claim 1.

14. A hydrocracking catalyst in the form of extrudates, wherein said extrudates are calcined, further wherein:
   the binder component further comprises about 5-10 W % silica, and about 80-90 W % alumina, each relative to the total mass of the binder component;
   the phosphorous active comprises about 1.0-3.0 W % of the phosphorus active component relative to the total mass of the hydrocracking catalyst;
   the one or more hydrocracking metal active components comprise one or more metals or metal compounds (oxides or sulfides) of Mo, W, Co or Ni;
   the hydrocracking catalyst having a specific surface area of 200 to 450 $m^2/g$; a volume of pores having a diameter of 600 Å or less of 0.40 to 0.75 ml/g; and
   the post-framework modified USY zeolite comprise one or more of titanium, zirconium and/or hafnium substituting aluminum atoms constituting a zeolite framework of the USY zeolite, and having (a) a crystal lattice constant of 2.430 to 2.450 nm, (b) a specific surface area of 600 to 900 m²/g, and (c) a molar ratio of $SiO_2$ to $Al_2O_3$ of 10 to 100.

* * * * *